(12) United States Patent
Dubrow

(10) Patent No.: US 7,985,475 B2
(45) Date of Patent: Jul. 26, 2011

(54) SUPER-HYDROPHOBIC SURFACES, METHODS OF THEIR CONSTRUCTION AND USES THEREFOR

(75) Inventor: Robert Dubrow, San Carlos, CA (US)

(73) Assignee: Nanosys, Inc., Palo Alto, CA (US)

( * ) Notice: Subject to any disclaimer, the term of this patent is extended or adjusted under 35 U.S.C. 154(b) by 922 days.

(21) Appl. No.: 10/833,944

(22) Filed: Apr. 27, 2004

(65) Prior Publication Data

US 2005/0181195 A1    Aug. 18, 2005

Related U.S. Application Data

(60) Provisional application No. 60/466,229, filed on Apr. 28, 2003.

(51) Int. Cl.
*B32B 15/02*    (2006.01)
(52) U.S. Cl. ........ 428/359; 428/357; 428/375; 428/379; 428/389; 428/391; 977/762; 977/773; 977/778; 977/783; 977/832
(58) Field of Classification Search ................ 977/734, 977/742, 762, 778, 783, 810, 811, 902
See application file for complete search history.

(56) References Cited

U.S. PATENT DOCUMENTS

| | | |
|---|---|---|
| 5,196,396 A | 3/1993 | Lieber |
| 5,252,835 A | 10/1993 | Lieber et al. |
| 5,840,435 A | 11/1998 | Lieber et al. |
| 5,897,945 A | 4/1999 | Lieber et al. |
| 5,976,957 A | 11/1999 | Westwater et al. |
| 5,997,832 A | 12/1999 | Lieber et al. |
| 6,036,774 A | 3/2000 | Lieber et al. |
| 6,099,960 A * | 8/2000 | Tennent et al. ............ 428/367 |
| 6,106,913 A | 8/2000 | Scardino et al. |
| 6,130,143 A | 10/2000 | Westwater et al. |
| 6,159,742 A | 12/2000 | Lieber et al. |
| 6,190,634 B1 | 2/2001 | Lieber et al. |
| 6,207,229 B1 | 3/2001 | Lieber et al. |
| 6,265,333 B1 | 7/2001 | Dzenis et al. |
| 6,268,041 B1 | 7/2001 | Goldstein |
| 6,270,347 B1 | 8/2001 | Webster et al. |
| 6,313,015 B1 | 11/2001 | Lee et al. |
| 6,322,895 B1 | 11/2001 | Canham |
| 6,359,288 B1 | 3/2002 | Ying et al. |
| 6,666,214 B2 | 12/2003 | Canham |
| 6,670,179 B1 | 12/2003 | Mattson et al. |
| 6,720,240 B2 | 4/2004 | Gole et al. |
| 6,766,817 B2 | 7/2004 | Da Silva |

(Continued)

FOREIGN PATENT DOCUMENTS

WO    WO-9918893    4/1999

(Continued)

OTHER PUBLICATIONS

"Super-'Amphiphobic" Aligned Carbon Nanotube Films, Li et al., Angew. Chem. Int. Ed. vol. 40, 2001, pp. 1743-1746.*

(Continued)

*Primary Examiner* — Jill Gray
(74) *Attorney, Agent, or Firm* — Andrew L. Filler

(57) ABSTRACT

This invention provides novel super-liquidphobic nanofibers and structures comprising such nanofibers, as well as methods and uses for such nanofibers.

32 Claims, 12 Drawing Sheets

U.S. PATENT DOCUMENTS

| | | | | |
|---|---|---|---|---|
| 6,896,864 | B2* | 5/2005 | Clarke | 423/447.1 |
| 6,969,690 | B2* | 11/2005 | Zhou et al. | 438/787 |
| 7,147,894 | B2* | 12/2006 | Zhou et al. | 427/256 |
| 2002/0037383 | A1 | 3/2002 | Spillman et al. | |
| 2002/0049495 | A1 | 4/2002 | Kutryk et al. | |
| 2002/0090725 | A1 | 7/2002 | Simpson et al. | |
| 2002/0130311 | A1 | 9/2002 | Lieber et al. | |
| 2002/0167118 | A1 | 11/2002 | Billiet et al. | |
| 2002/0172963 | A1 | 11/2002 | Kelley et al. | |
| 2003/0012723 | A1* | 1/2003 | Clarke | 423/460 |
| 2003/0032892 | A1 | 2/2003 | Erlach et al. | |
| 2003/0059742 | A1 | 3/2003 | Webster et al. | |
| 2003/0065355 | A1 | 4/2003 | Weber | |
| 2003/0089899 | A1 | 5/2003 | Lieber et al. | |
| 2003/0093107 | A1 | 5/2003 | Parsonage et al. | |
| 2003/0102222 | A1 | 6/2003 | Zhou et al. | |
| 2003/0195611 | A1 | 10/2003 | Greenhalgh et al. | |
| 2003/0229393 | A1 | 12/2003 | Kutryk et al. | |
| 2004/0009598 | A1 | 1/2004 | Hench et al. | |
| 2004/0023317 | A1 | 2/2004 | Motamedi et al. | |
| 2004/0076681 | A1 | 4/2004 | Dennis et al. | |
| 2004/0106203 | A1 | 6/2004 | Stasiak et al. | |
| 2004/0115239 | A1 | 6/2004 | Shastri et al. | |
| 2004/0116028 | A1* | 6/2004 | Bryner | 442/381 |
| 2004/0052867 | A1 | 8/2004 | Canham | |
| 2005/0008776 | A1* | 1/2005 | Chhabra et al. | 427/180 |
| 2005/0038498 | A1 | 2/2005 | Dubrow et al. | |
| 2005/0096509 | A1 | 5/2005 | Olson | |
| 2005/0156504 | A1* | 7/2005 | Takai et al. | 313/495 |
| 2005/0179746 | A1* | 8/2005 | Roux et al. | 347/69 |
| 2005/0219788 | A1* | 10/2005 | Chow et al. | 361/305 |
| 2006/0159916 | A1* | 7/2006 | Dubrow et al. | 428/357 |

FOREIGN PATENT DOCUMENTS

| | | |
|---|---|---|
| WO | WO-9940812 | 8/1999 |
| WO | WO-0149776 | 7/2001 |
| WO | WO-03095190 | 11/2003 |
| WO | WO-03097702 | 11/2003 |
| WO | WO-03099951 | 12/2003 |
| WO | WO-03102099 | 12/2003 |
| WO | WO-2004094303 | 11/2004 |
| WO | WO-2004099068 | 11/2004 |

OTHER PUBLICATIONS

"Super-Hydrophobic Surfaces: From Natural to Artificial", Feng et al., Adv. Meter. vol. 14, 2002, pp. 1857-1860.*

"Super-Hydrophobic Surface of Aligned Polyacrylonitrile Nanofibers", Feng et al., Angew. Chem., vol. 114, 2002, pp. 1269-1271.*

"Superhydrophobicity of Nanostructured Carbon Films in a Wide Range of pH Values", Feng et al., Angew. Chem. Int. Ed., vol. 42, Sep. 15, 2003, pp. 4217-4220.*

"Creation of a Superhydrophobic Surface from an Amphiphilic Polymer". Feng et al., Angew. Chem. Int. Ed., vol. 42, Feb. 17, 2003, pp. 800-802.*

"Improvement on superhydrophobic behaviour of carbon nanofibers via the design of experiment and analysis of variance", Lin et al., J. Vac. Sci. Technol. B, 206, pp. 855-859, 2006.*

"Nanostructured superhydrophobic surfaces", Shang et al., Springer Science + Business Media, Inc., 2005, pp. 3587-3591.*

"Influence of fluorine/carbon atomic ratio on superhydrophobic behavior of carbon nanofiber arrays", J. Vac. Sci. Technol. B. vol. 24, 2006, pp. 113-117.*

Autumn, K. et al., "Adhesive force of a single gecko foot-hair" Nature (2000) 405:681-685.

Chen, I.W. et al., "Sintering dense nanocrystalline ceramics without final-stage grain growth" Nature (2000) 404(6774):168-171.

Choi, H. et al., "Surface-modified silica colloid for diagnostic imaging" J. Colloid Interface Sci (2003) 258(2):435-437.

Cui et al., "Functional nanoscale electronic devices assembled using silicon nanowire building blocks" Science (2001) 291:851-853.

Cui et al., "Nanowire nanosensors for highly sensitive and selective detection of biological and chemical species" Science (2001) 293:1289-1292.

Davis, D.H. et al., "Immobilization of RGD to <111> silicon surfaces for enhanced cell adhesion and proliferation" Biomaterials (2002) 23:4019-4027.

Duan et al., "Single-nanowire electrically driven lasers" Nature (2003) 421:241-245.

Geim, A.K. et al., "Microfabricated adhesive mimicking gecko foot-hair" Nature Materials (2003) 2:461-463.

Greene, L.E. et al., "Low-Temperature Wafer-Scale Production of ZnO Nanowire Arrays" Angew. Chem. Int. Ed. (2003) 42:3031-3034.

Hanekamp C. et al., "Randomized comparison of balloon angioplasty versus silicon carbon-coated stent implantation for de novo lesions in small coronary arteries" Am. J. Cardiol. (2004) 93(10):1233-1237.

Huang, et al., "Integrated optoelectronics assembed from semiconductor nanowires" Abstracts of Papers of the ACS (2002) 224:U308.

Price, R.L. et al., "Nanometer surface roughness increases select osteoblast adhesion on carbon nanofiber compacts" J. Biomed. Mat. Res. (2004) 70A(1):129-138.

Shastri, V.P., "Non-degradable biocompatible polymers in medicine: past, present and future" Curr Pharm. Biotechnol. (2003) 4(5):331-337.

Silva, G.A. et al., "Selective differentiation of neural progenitor cells by high-epitope density nanfibers" Science (2004) 303:1352-1355.

Webster, T.J. et al., "Nano-biotechnology: carbon nanofibres as improved neural and orthopaedic implants" Nanotechnology (2004) 15:48-54.

Webster, T.J. et al., "Increased osteoblast adhesion on nanophase metals: Ti, Ti6A14V, and CoCrMo" Biomaterials (2004) 25:4731-4739.

Yang, P. et al., "Inorganic semiconductor nanowires" Nanoscience (2002) 1:1-39.

Xu, H. et al., "Room-temperature preparation and characterization of poly(ethylene glycol)-coated silica nanoparticles for biomedical applications" J. Biomed. Mat. Res. (2003) 66A(4):870-879.

Xu, H. et al., "Strong and bioactive composites containing nano-silica-fused whiskers for bone repair" Biomaterials (2004) 25:4615-4626.

Zhou et al., "Silicon nanowires as chemical sensors" Chem. Phys. Lett. (2003) 369:220-224.

\* cited by examiner

1100

SUPER-HYDROPHOBIC SURFACES, METHODS OF THEIR CONSTRUCTION AND USES THEREFOR

CROSS-REFERENCE TO RELATED APPLICATIONS

This application is a claims benefit of, and priority to, U.S. Provisional Application No. 60/466,229 filed Apr. 28, 2003, entitled "SUPER-HYDROPHOBIC SURFACES, METHODS OF THEIR CONSTRUCTION AND USES THEREFOR." This prior application is hereby incorporated by reference in its entirety.

FIELD OF THE INVENTION

The invention relates primarily to the field of nanotechnology. More specifically, the invention pertains to nanofibers and nanofiber structures comprising exogenous hydrophobic, lipophobic, or amphiphobic material and which display super-hydrophobic, super-lipophobic, and/or super-amphiphobic properties.

BACKGROUND OF THE INVENTION

Water repellency, or hydrophobicity, of materials is of great importance in myriad applications from aesthetic to industrial uses. For example, increased hydrophobicity is often desirable in surfaces subject to ice/snow accumulation or exposure to water. In yet other instances lipophobicity (lipid repellency) and/or amphiphobicity (repellency of both water and lipids) are also of use (e.g., in transport or storage of lipid based fluids, etc.). Numerous studies trying to achieve such liquidphobicities (e.g., hydrophobicity, lipophobicity, amphiphobicity, etc.) have focused upon use of various coatings or surface texture modifications. For example, hydrocarbon and fluorine containing compounds and waxes have traditionally been used to increase liquidphobicity of materials. Recently, other approaches have used roughening of surfaces to achieve some types, or some degree, of liquidphobicity.

Alternative to, or in addition to, liquidphobicity, some situations require super-liquidphobicity (e.g., super-hydrophobicity). Again, as with liquidphobicity, typical previous work has focused on liquidphobic coatings (e.g., those containing silane, etc.) and surface texture modification.

Parallel to the increasing desire for liquidphobic materials has been an increased focus on design and use of nanostructures (e.g., carbon nanotubes, nanowires, nanorods, quantum dots, etc.). A great deal of attention has arisen over novel properties expressed by nanostructures in, e.g., electrical, mechanical, and chemical applications. See, e.g., Yang, et al. (2002) *Intl. J. Nanoscience,* 1(1):1-39.

A welcome addition to the art would be a surface or surface layer which can be tailored to various degrees and types of super-liquidphobicity, which optionally could be transferred to secondary surfaces of many different structures, etc., which could be used in a variety of settings/situations, and which would also include the desirable properties of nanostructures. The current invention presents these and yet other novel benefits which will be apparent upon examination of the following.

SUMMARY OF THE INVENTION

In various aspects herein, the invention comprises a super-liquidphobic substrate that comprises at least a first surface and a plurality of nanofibers which comprise one or more exogenous liquidphobic material. In some embodiments, the nanofibers comprise a non-carbon material (e.g., typically silicon). In other embodiments, the nanofibers comprise solid nanofibers and/or crystalline nanofibers. The nanofibers of various embodiments can comprise a surface density (e.g., on a surface or substrate) of from about 1 nanofiber per 10 micron$^2$ or less to about 200 nanofibers per micron$^2$; of from about 1 nanofiber per micron$^2$ or less to about 150 or more nanofibers per micron$^2$; of from about 10 nanofiber per micron$^2$ or less to about 100 or more nanofibers per micron$^2$; of from about 25 nanofibers per micron$^2$ or less to about 75 or more nanofibers per micron$^2$. Optionally, the substrates in various embodiments herein can comprise nanofibers that have a percent coverage of the first surface of from about 0.01% to about 50%; of from about 0.25% to about 40%; of from about 0.5% to about 30%; of from about 1% to about 20%; of from about 5% to about 15%; of from about 0.1% to about 5%; or of about 1%. In other embodiments herein, the nanofibers comprise a length of from about 1 micron to about 200 microns; of from about 5 microns to about 150 microns; of from about 10 microns to about 125 microns; or of from about 50 microns to about 100 microns. In some embodiments, the nanofibers herein can comprise a diameter of from about 5 nanometers to about 1 micron; of from about 20 nm to about 250 nm; of from about 40 nm to about 200 nm; of from about 50 nm to about 150 nm; or of from about 75 nm to about 100 nm. In yet other embodiments herein, the nanofibers comprise a height to diameter aspect ratio of approximately 2:1; of approximately 2000:1; of from approximately 2:1 to about 40:1 or greater; of from approximately 5:1 to about 30:1 or greater; or of from approximately 10:1 to about 20:1 or greater. In various embodiments, the substrate surface(s) herein, e.g., which comprise the nanofibers, can comprise (but are not limited to) one or more of silicon, glass, a transparent substrate, a semi-transparent substrate, a translucent substrate, quartz, plastic, metal, polymers, TiO, ZnO, ZnS, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, BaTe, GaN, GaP, GaAs, GaSb, InN, InP, InAs, InSb, PbS, PbSe, PbTe, AlS, AlP, AlSb, SiO$_1$, SiO$_2$, silicon carbide, silicon nitride, polyacrylonitrile (PAN), polyetherketone, polyimide, an aromatic polymer, or an aliphatic polymer. The exogenous material comprised with the nanofibers can optionally be one or more of a hydrophobic material, a lipophobic material, or an amphiphobic material. For example, the material can comprises one or more material selected from the group consisting of: Teflon®, Tri-sil, tridecafluoro 1,1,2,2, tetrahydrooctyl-1-tricholorosilane, a fluoride containing compound, a silane containing compound, PTFE, hexamethyldisilazane, an aliphatic hydrocarbon containing molecule, an aromatic hydrocarbon containing molecule, a halogen containing molecule and paralyene. In the embodiments herein, a liquid drop (e.g., water based and/or lipid based and/or non-water/non-lipid based) on a substrate of the invention optionally displays a contact angle from at least about 150° to about 179.5° or more; a contact angle from at least about 160° to about 179.5° or more; a contact angle from at least about 170° to about 179.5° or more; a contact angle from at least about 175° to about 179.5° or more; or a contact angle from at least about 178° to about 179.5° or more. Optionally, the nanofibers are grown on the at least first surface of the substrate. Alternatively, the nanofibers are grown on a second surface and transferred to the first surface.

In other aspects the invention comprises a super-liquidphobic substrate, wherein a liquid drop on the substrate displays a contact angle of at least 160° (or at least 170° in some embodiments) or more and where the substrate comprises at least a first surface, a plurality of nanofibers which nanofibers comprise one or more exogenous liquidphobic material and which nanofibers comprise a percent coverage of the substrate surface from about 0.01% to about 50%, and which nanofibers comprise a length to diameter aspect ratio of from about 2:1 to about 40:1 (or from about 100:1 to about 2000:1 in some embodiments).

Other aspects of the invention comprise systems or devices that comprise one or more super-liquidphobic substrate of the invention (e.g., a system or device comprising one or more super-liquidphobic substrate wherein a liquid drop on the substrate displays a contact angle from at least about 150° to about 179.5° or more, from at least about 155° to about 179.5° or more, from at least about 160° to about 179.5° or more, from at least about 165° to about 179.5° or more, from at least about 170° to about 179.5° or more, from at least about 175° to about 179.5° or more, or from at least about 178° to about 179.5° or more.

Yet other aspects of the invention include methods of producing a contact angle of at least 150° (or, in various embodiments, 160° or 170° or 175° or 178° or 179.5° or more) between one or more liquid drop and a substrate, the methods comprising providing one or more liquid drop; providing one or more substrate, which substrate comprises a first surface and a plurality of nanofibers comprising an exogenous liquidphobic material; contacting the liquid drop (e.g., a lipid drop, a non-lipid drop (e.g., an aqueous drop), or a lipid drop or a non-lipid drop) with the one or more substrate.

The invention also includes aspects involving a method of exchange between a first medium and one or more second medium by providing a substrate with one or more surface area having a plurality of nanofibers (e.g., non-carbon and/or solid and/or crystalline nanofibers) wherein the nanofibers are treated with one or more exogenous material, thus, forming a super-liquidphobic substrate; and physically contacting the first medium and the one or more second medium with the substrate. In some such embodiments, the first medium is disposed solely between the members of the plurality of nanofibers (e.g., in the interstitial area/space in amongst and between the nanofibers) and the one or more second medium is disposed solely above the plurality of nanofibers (e.g., on top of the layer of nanofibers as opposed to in amongst the layer of nanofibers). Such methods include wherein the media are gases, liquids, and/or solids (e.g., dry slurries, etc.). The exchange between the media can be one of heat exchange (e.g., an exchange of heat from one medium to the other). Other embodiments include wherein the exchange is of one or more constituent between the media (e.g., which constituent is present within the first and/or second medium).

The current invention also includes methods of heat exchange between a substrate and a liquid or gas by providing a vessel comprising a substrate with one or more surface area with a plurality of nanofibers (e.g., non-carbon and/or solid and/or crystalline nanofibers) wherein the nanofibers are treated with one or more material, which vessel is in physical contact with one or more liquid or gas; and, providing a heat source or cooling source for the vessel. Such substrates can comprise, e.g., a superhydrophobic substrate, a super-lipophobic substrate, or a super-amphiphobic substrate, etc.

Also included within the current invention are methods for decreasing flow resistance in channels, by providing a channel comprising a substrate with one or more surface area with a plurality of nanofibers (e.g., non-carbon and/or solid and/or crystalline nanofibers) wherein the nanofibers are treated with one or more material, thereby producing a super-liquidphobic substrate; and, flowing a liquid or gas or solid (e.g., a powder or a dry slurry, etc.) through the channel. Such channels can comprise, e.g., microfluidic channels.

Other methods of the current invention include those for storing or transporting materials in vessels while decreasing residual trapping of the material in the vessel. Such methods are done by providing a vessel comprising a wall with one or more surface area comprising a plurality of nanofibers (e.g., non-carbon and/or solid and/or crystalline nanofibers) wherein the nanofibers are treated with one or more material, thereby producing a super-liquidphobic wall; and, providing a material to be transported, which material is in physical contact with the wall. The materials being stored/transported can comprise, e.g., fluids, gasses, solids, etc.

The current invention also includes methods for preventing or reducing accumulation of ice on a substrate, by providing a substrate (e.g., an aircraft fuselage, wiring or component or the like, all of which are optionally heated) with one or more surface area comprising a plurality of nanofibers (e.g., non-carbon and/or solid and/or crystalline nanofibers) wherein the nanofibers are treated with one or more material, thereby producing a super-liquidphobic substrate; and, subjecting the substrate to 0° C. or colder in the presence of a liquid or gas comprising H2O.

Other aspects of the invention include methods for preventing or reducing leakage from vessels (e.g., containers of various sorts). Such methods comprise providing a vessel (e.g., an underground storage tank optionally holding a toxin, waste, or hazardous material) having at least one wall with one or more surface area comprising a plurality of nanofibers (e.g., non-carbon and/or solid and/or crystalline nanofibers) wherein the nanofibers are treated with one or more material, thereby producing a super-liquidphobic vessel wall; and, providing one or more content within the vessel.

The current invention also includes methods of preventing or reducing water (or other liquid, e.g., lipid liquids) intrusion into an area, by providing a component(s) comprising at least one substrate with one or more surface area comprising a plurality of nanofibers (e.g., non-carbon and/or solid and/or crystalline nanofibers) wherein the nanofibers are treated with one or more material, thereby producing a super-liquidphobic substrate; and, providing one or more of water or ambient conditions conducive to formation/accumulation of such, which water is in physical contact with the substrate. Alternatively, other liquids could be provided in such physical contact, e.g., lipids, etc.

Other aspects of the invention comprise methods of platen printing through providing at least one substrate with one or more surface area comprising a plurality of nanofibers (e.g., non-carbon and/or solid and/or crystalline nanofibers) wherein the nanofibers are treated with one or more material, thereby producing a super-liquidphobic substrate; etching or removing one or more prescribed area of nanofibers within the surface area, thus producing a patterned area of super-liquidphobic substrate and a patterned area of bare surface not comprising nanofibers; providing one or more ink or dye which preferentially locates within the patterned area of bare surface; and, contacting the substrate with one or more second substrate, thus transferring the ink or dye to the second substrate in a pattern corresponding to the patterned area of bare surface.

The invention also has aspects involving methods of patterning a surface through providing at least one substrate with one or more surface area comprising a plurality of nanofibers (e.g., non-carbon and/or solid and/or crystalline nanofibers) wherein the nanofibers are treated with one or more material, thereby producing a super-liquidphobic substrate; and, etching or removing one or more prescribed area of nanofibers within the surface area, thus producing a patterned area of super-liquidphobic substrate and a patterned area of bare surface not comprising nanofibers.

Yet other aspects of the invention involve methods of patterning a surface by providing at least one substrate with one or more surface area comprising a plurality of nanofibers (e.g., non-carbon and/or solid and/or crystalline nanofibers); and, treating one or more region on the at least one substrate with one or more liquidphobic material in a selected pattern, thereby producing a patterned super-liquidphobic substrate.

These and other objects and features of the invention will become more fully apparent when the following detailed description is read in conjunction with the accompanying figures.

DETAILED DESCRIPTION

Figure 1A:
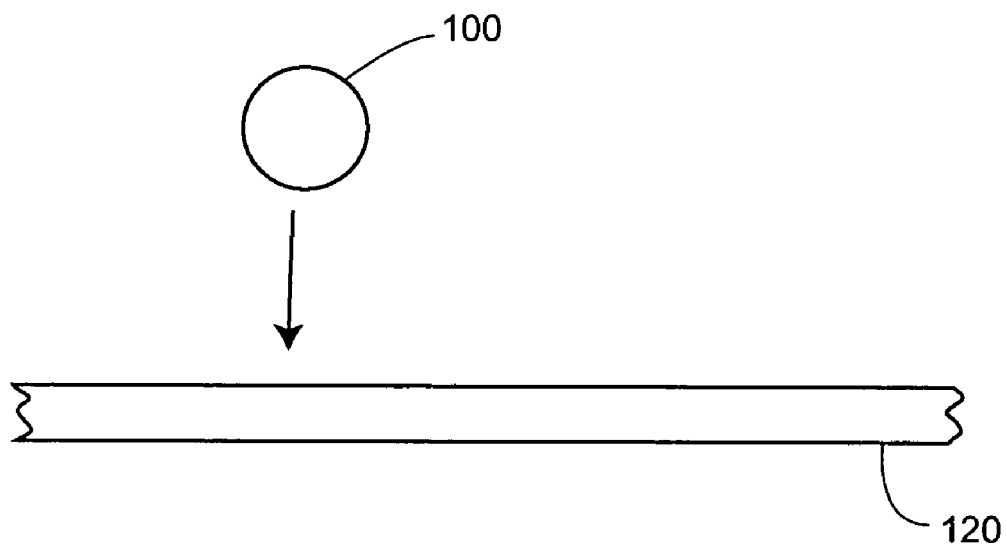
FIG. 1, Panels A and B, Displays schematic representations of an interaction between a liquid drop and a substrate surface.

The current invention comprises nanofiber surfaces that have been treated with, or which comprise, exogenous liquidphobic material in order to make the nanofibers super-liquidphobic (e.g., superhydrophobic, etc.). In particular, and without being bound to any particular theory or mechanism of operation, it is believed that the nanofiber surfaces described herein provide unique contact properties that, when treated to increase liquidphobicity, actually result in super-liquidphobic (e.g., superhydrophobic, etc.) surfaces. For example, the addition of methyl groups, fluorine groups and the like to the nanofiber surfaces produces extremely super-liquidphobic surfaces. Thus, water applied to such superhydrophobic surfaces becomes spherical and rolls off the surface as do streams of water. Even other non-wetable hydrophobic surfaces such as Teflon® do not show such extreme properties. Thus, the current invention is optionally used in applications which desire water and/or lipid (e.g., grease) repellent coatings or bio-inert layers, as well as for virtual surfaces for separations, low friction coatings for fluidic applications, e.g., fluid conduits such as pipes, manifolds, channels, capillaries, microfluidic conduits, etc., as well as aquatic and marine applications, e.g., ships/submarines, torpedoes, and even aesthetic constructions such as toys, fountains, etc.

As can be appreciated, liquidphobic surfaces are useful in many applications. Nanofiber surfaces (i.e., surfaces comprising features with an aspect ratio greater than one and having features with a diameter in the nanoscale) take the concept to an extreme when possessing, or when treated with, an appropriate chemical functionality. For example, as explained in more detail below, silicon nanofibers grown on a silicon wafer and treated with a methylating agent cause water to form spherical drops that easily roll off the surface. Similar nanofiber surfaces when treated with a fluorinated compound cause mineral oil to bead up and roll off the surface in a similar fashion. Again, without being bound to any particular mechanism of operation, it is believed that if containers (e.g., wells or tubes, etc.) are coated with such treated nanofibers, a liquid used to fill such container will only contact the uppermost portion of the nanofibers disposed on the substrate (which typically make up less than 1% of the underlying substrate surface area). See, e.g., FIGS. 4-6. Thus, minimal wall interaction will occur and basically a virtual container will result. Such a virtual container will reduce chemical interactions between the liquid and the surface of the container, which interactions have long been the source of substantial problems in analytical, biological and chemical applications. The super-liquidphobic properties of the current invention are also beneficial in, e.g., dispensing of liquids for drug delivery or into analytical instruments or in the formation of spherical products, as well as many other uses which will be appreciated by those of skill in the art and select (but not limiting) examples of which are detailed herein.

DEFINITIONS

Before describing the present invention in detail, it is to be understood that this invention is not limited to particular configurations, which can, of course, vary (e.g., different combinations of nanofibers and coatings, etc. which are optionally present in a range of lengths, densities, etc.). It is also to be understood that the terminology used herein is for the purpose of describing particular embodiments only, and is not intended to be limiting. As used in this specification and the appended claims, the singular forms "a," "an," and "the" include plural referents unless the context clearly dictates otherwise. Thus, for example, reference to "a nanofiber" optionally includes a plurality of such nanofibers, and the like.

Unless defined otherwise, all scientific and technical terms are understood to have the same meaning as commonly used in the art to which they pertain. For the purpose of the present invention, additional specific terms are defined herein.

The term "nanofiber" refers herein to an elongated nanostructure, typically characterized by at least one cross-sectional dimension less than about 1000 nm e.g., less than about 500 nm, less than about 250 nm, less than about 100 nm, less than about 50 nm, less than about 40 nm, less than about 30 nm, less than about 20 nm, less than about 10 nm, or even about 5 nm or less. In many case the region or characteristic dimension will be along the smallest axis of the structure. Nanofibers of this invention typically have one principle axis that is longer than the other two principle axes and, thus, have an aspect ratio greater than one, an aspect ratio of 2 or greater, an aspect ratio greater than about 10, an aspect ratio greater than about 20, and often an aspect ratio greater than about 100, 200, 500, 1000, or 2000.

A nanofiber herein is optionally substantially a single crystal in structure (a "single crystal nanofiber" or a "monocrystalline nanofiber"). A nanofiber also is optionally conductive or semiconductive. A "homo-nanofiber" is a nanofiber that has an essentially homogeneous arrangement of constituent elements. For example, a homo-nanofiber can be a single crystal structure comprising a base material such as silicon and a dopant dispersed in essentially the same manner throughout the crystal. A "hetero-nanofiber" is a nanofiber that includes subdomains comprising different compositions. For example, a hetero-nanofiber can be a single crystal structure comprising a base material such as silicon, with different subdomains or "segments" having different dopants, or different concentrations of one dopant, or both. Examples of nanofibers include semiconductor nanofibers as described in Published International Patent Application Nos. WO 02/17362, WO 02/48701, and 01/03208 (all of which are incorporated by reference in their entirety for all purposes), and other elongated structures of like dimensions (e.g., in some embodiments, nanowhiskers, etc.).

In certain embodiments, nanofiber according to this invention have a substantially uniform diameter. In some embodiments, the diameter shows a variance less than about 20%, less than about 10%, less than about 5%, or less than about 1% over the region of greatest variability and over a linear dimension of at least 5 nm, at least 10 nm, at least 20 nm, or at least 50 nm. Typically the diameter is evaluated away from the ends of the nanofiber (e.g. over the central 20%, 40%, 50%, or 80% of the nanofiber). In yet other embodiments, the nanofibers herein have a non-uniform diameter (i.e., they vary in diameter along their length).

The nanofibers of the invention are optionally composed of any of a number of different materials and can be fabricated from essentially any convenient material or materials. See below. In some typical embodiments herein, the nanofibers of the invention comprise a non-carbon or inorganic material. Also, in some embodiments, the nanofibers comprise silicon or a silicon containing compound (e.g., a silicon oxide). Various preferred embodiments herein also optionally typically do not comprise nanofibers of polyvinyl alcohol, polyacrylonitrile (or aligned polyacrylonitrile fibers), polystyrene, polyester, or polyamide. Embodiments of the invention can also comprise nanofibers that are solid and/or crystalline. Preferred embodiments herein do not typically comprise nanotubes, however, such nanotubes are optionally useful in similar fashion as other nanofibers herein (e.g., when the nanotubes are modified with a liquidphobic material, etc.). Additionally, silicon nano-posts are not typically comprised within preferred embodiments herein. Again, however, preferred embodiments herein typically do not utilize carbon nanotubes, but rather comprise solid nanofiber constituents.

In certain embodiments, the nanofibers range in length from about 10 nm to about 200 µm, or from about 20 nm to about 100 µm, or from about 20 nm or 50 nm to about 500 nm. Certain nanofibers herein have a length less than about 1 µm, less than about 500 nm, less than about 250 nm, less than about 100 nm, less than about 75 nm, less than about 50 nm, less than about 25 nm, or less than about 20 nm, less than about 10 nm. In some embodiments, the nanofibers comprise a length of between 1 um and 100 um or from about 5 um to about 100 um. In other embodiments, the diameter of such nanofibers comprises about 50 nm. Additionally, as stated above, nanofibers herein are typically solid and are typically comprised of inorganic materials (e.g., in typical embodiments silicon).

The terms "crystalline" or "substantially crystalline," when used with respect to the nanofibers of this invention refer to the fact that the nanofibers typically exhibit long-range ordering. The nanofibers of this invention can bear a hydrophobic, lipophobic, amphiphobic or other liquidphobic coating. See below. In such instances it will be appreciated that the coating need not exhibit such ordering (e.g. the coating can be amorphous, or otherwise). In such instances, the phrase "crystalline," or "substantially crystalline" or "substantially monocrystalline" or "monocrystalline" refers to the central "core" of the nanofiber (i.e., excluding the coating layer(s)). The terms "crystalline" or "substantially crystalline" as used herein are intended to also encompass structures comprising various defects, atomic substitutions and the like as long as the structure exhibits substantial long range ordering. The term "monocrystalline," when used with respect to a nanofiber of this invention indicates that the nanofiber is substantially crystalline and comprises substantially a single crystal. Nothing in the foregoing definition, however, is intended to imply that the nanofiber surfaces of the invention are required to comprise such crystallinity in the absence of an express statement to that effect.

The term nanofiber can optionally also include such structures as, e.g., nanowires, nanowhiskers, semi-conducting nanofibers and non-carbon nanotubes (e.g., boron nanotubes or nanotubules) and the like. See, above. Additionally, in some embodiments herein, nanocrystals or other similar nanostructures can also be used in place of more "typical" nanofibers to produce super-liquidphobic surfaces. For example, nanostructures having smaller aspect ratios (e.g., than those described above), such as nanorods, nanotetrapods, nanoposts (e.g., non-silicon nanoposts), and the like are also optionally included within the nanofiber definition herein (in certain embodiments). Examples of such other optionally included nanostructures can be found, e.g., in published PCT Application No. WO 03/054953 and the references discussed therein, all of which are incorporated herein by reference in their entirety for all purposes.

"Amphiphobic" describes a characteristic of a material which is both hydrophobic and lipophobic and thus repels both lipid and non-lipid or aqueous/water-based liquids.

"Liquidphobic" or "super-liquidphobic" as used herein describes, in a general sense, any material that displays anti-liquid properties, e.g., a material that is one or more of hydrophobic, lipophobic, amphiphobic, or the like (in the case of liquidphobic) or super-hydrophobic, super-lipophobic, or super-amphiphobic (in the case of super-liquidphobic). Such materials repel liquids, e.g., by causing the liquid to bead-up on the material's surface and not spread out or wet the material's surface. The liquids involved are optionally of one or more liquid types (e.g., lipids, aqueous liquids, non-aqueous non-lipid liquids, etc.) depending upon, e.g., the particular coating material, etc. used in conjunction with the nanofibers. Thus, as used herein, a substrate (e.g., a nanofiber substrate comprising an exogenous material, etc.) that is described as super-liquidphobic could be one or more of super-hydrophobic, super-lipophobic, or super-amphiphobic depending upon context.

"Super-hydrophobicity," "super-lipophobicity," "super-amphiphobicity," and "super-liquidphobicity" all refer to properties of substances which cause a liquid drop on their surface to have a contact angle of 150° or greater. Depending upon context, the liquid drop can comprise, e.g., a water/water based/aqueous drop (super-hydrophobicity), a lipid based drop (super-lipophobicity), a water based or lipid based drop (super-amphiphobicity), or other liquids. Super-liquidphobicity comprises a generic term indicating a substance which causes a fluid drop (e.g., lipid based, aqueous based, or other) to have a greater than 150° contact angle.

Other terms, e.g., "coating" are described elsewhere herein.

Measurement of Liquidphobicity

When a drop of a liquid (e.g., water based, lipid based, etc.) rests upon a surface, it will spread out over the surface to a degree based upon such factors as the surface tensions of the liquid and the substrate, the smoothness or roughness of the surface, etc. For example, the liquidphobicity of a substrate can be increased by various coatings that lower the surface energy of the substrate. The quantification of liquidphobicity can be expressed as the degree of contact surface angle (or contact angle) of the drop of the liquid on the surface.

Figure 1B:
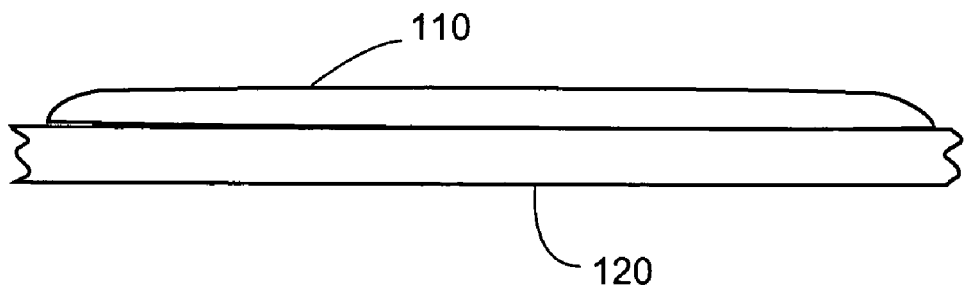

For example, as shown in FIGS. 1a and 1b, for a surface having a high surface tension (i.e., higher than the surface tension of the liquid drop), a drop of liquid, 100, will spread out, 110, "wetting" the surface of the substrate, 120. Such surface displays liquidphilicity, as opposed to liquidphobicity. In instances where the contact angle is greater than zero (e.g., where the surface displays a greater degree of liquidphobicity), the relationship of the surface tension ($\gamma$) and the contact angle ($\theta$) is shown by Young's equation:

$$\cos\theta = \frac{(\gamma_{SV} - \gamma_{SL})}{\gamma_{LV}}$$

Figure 2:
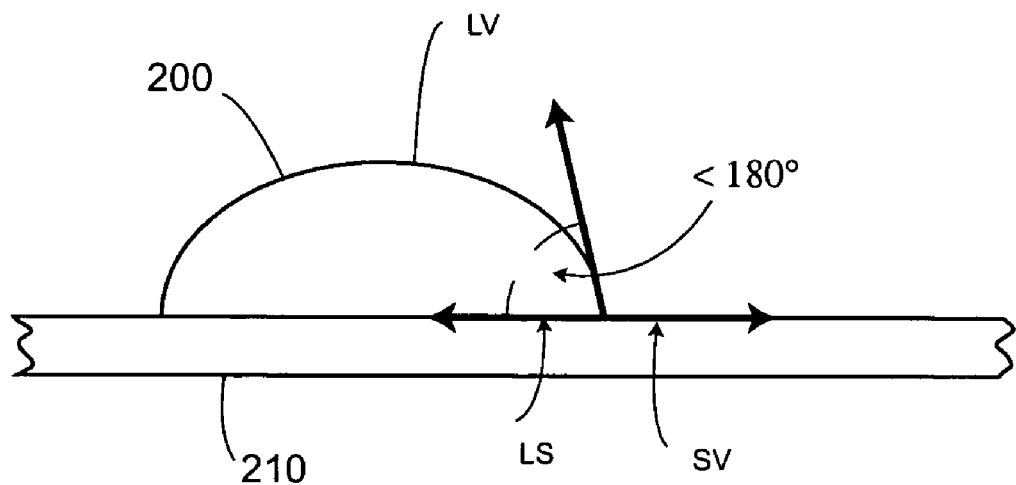
FIG. 2, Displays a schematic representation of an interaction between a liquid drop and a liquidphobic substrate surface.
Figure 3:
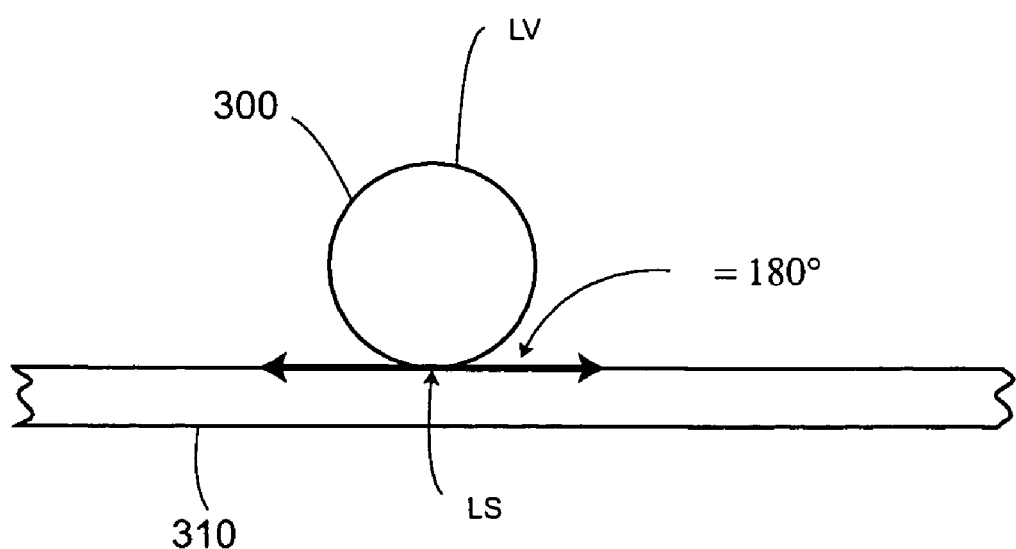
FIG. 3, Displays a schematic representation of an interaction between a liquid drop and a super-liquidphobic substrate surface.

(1)

where $\gamma_{SV}$, $\gamma_{SL}$, and $\gamma_{LV}$ are the surface energies (i.e., the interstitial free energies per unit area) of the solid/vapor, solid/liquid and liquid/vapor interfaces respectfully, and $\theta$ is the contact angle between the liquid drop and the substrate surface. See, e.g., FIG. 2 showing liquid drop, 200, on substrate, 210 and FIG. 3 showing liquid drop, 300, on substrate 310. Thus, when the surface energy is decreased, liquidphobicity is increased (and vice versa). For smooth surfaces, maximum contact angles of around 120° have been achieved for $CF_3$-terminated substrates.

In FIG. 1b the contact angle approaches zero (i.e., is very low), while in FIGS. 2 and 3, the contact angle increases until it is 180° in FIG. 3. Surfaces having contact angles of 150° and above are described as super-liquidphobic (e.g., superhydrophobic where the liquid is aqueous, super-lipophobic where the liquid is a lipid, super-amphiphobic where the liquid can be either a lipid or non-lipid, etc.).

In order to get release of a liquid from a substrate, the surface of the substrate should have a lower critical surface tension than that of the liquid in question. In general, many liquids have a critical surface tension greater than 20 dynes/cm. For example, deionized water at 20° C. has a critical surface tension of 73 dynes/cm, while DMSO is 25 dynes/cm, and toluene is 28 dynes/cm. Examples of exemplary critical surface tensions of smooth surfaced substrates include soda glass at 30 dynes/cm, 301 stainless steel at 44 dynes/cm, and Teflon® at 18 dynes/cm.

Young's equation above is applicable when the substrate surface is smooth.

However, when the substrate surface is rough, then such roughness must be taken into account in determining the contact angle. Thus, Wenzel's equation:

$$\cos\theta' = r(\gamma_{SV} - \gamma_{SL})/\gamma_{LV} = r\cos\theta$$

(2)

is used to determine contact angle. In this equation 'r' represents the 'roughness factor' of the surface and is defined as the ratio of the actual area of a surface compared to the expected geometric area of the surface. Wenzel's equation can also be written as:

$$\cos\theta_W = r\cos\theta_Y$$

(3)

where $\theta_W$ is the Wenzel angle and $\theta_Y$ is the Young angle. It should be noted that the roughness in Wenzel's analysis is quite small in nature and is not so great as to form voids between the substrate and the liquid.

However, for surfaces that are rough enough so that air does become trapped between the substrate surface and the liquid (thus, forming a composite interface), Cassie's equation is used. In Cassie's equation, the contact angle is determined by:

$$\cos\theta' = f\cos\theta + (1-f)\cos 180° = f\cos\theta + f - 1$$

Figure 4:
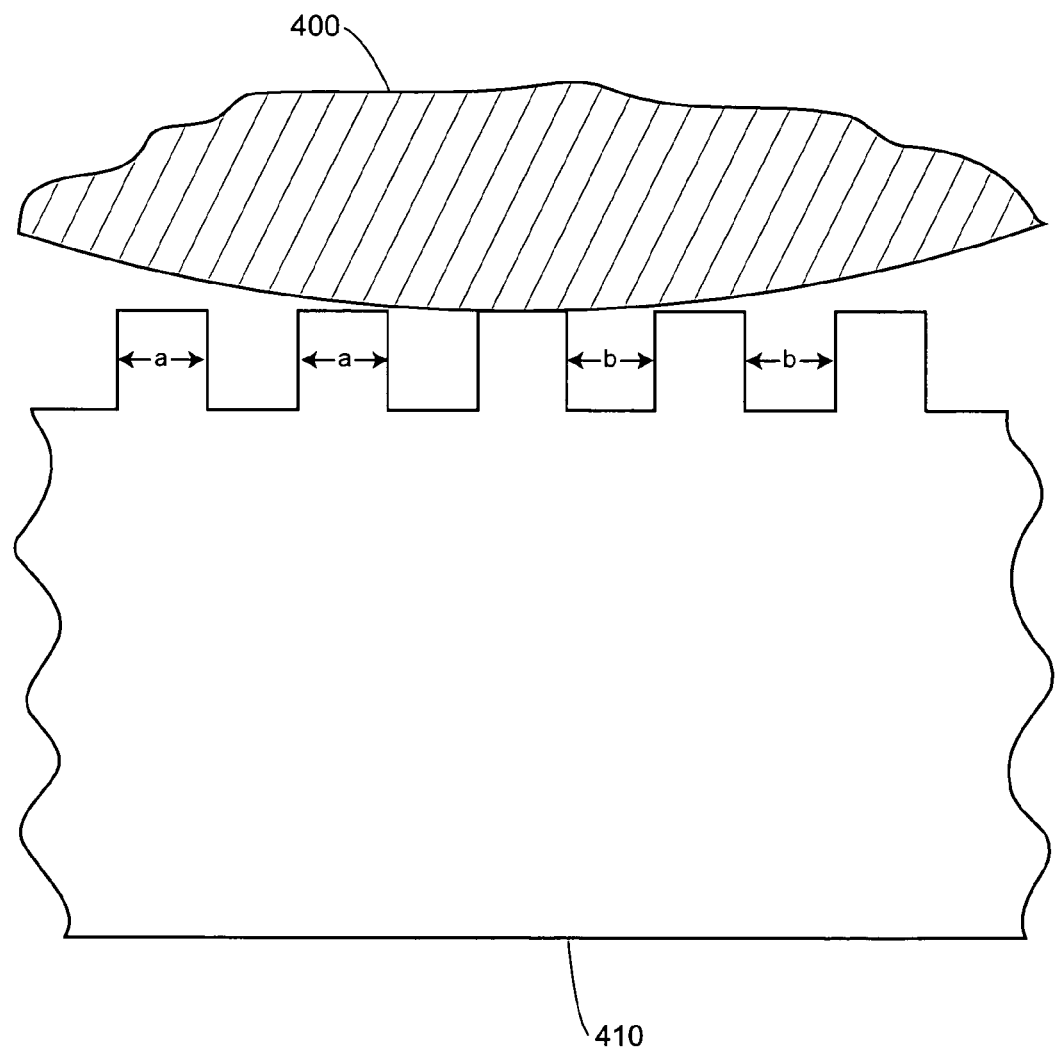
FIG. 4, Displays a schematic representation of an interaction between a liquid drop and a roughened substrate surface.

(4)

where $\theta'$ represents the contact angle between the liquid and the air/substrate surface. In the equation, an air/liquid contact angle of 180° is assumed. Also, in the equation, f equals $\Sigma_a/\Sigma(a+b)$, the solid surface area fraction (i.e., the area 'a' being the area of contact between the substrate surface and the liquid and the area 'b' being the area of contact between the liquid and the air trapped in between the liquid and the substrate). See FIG. 4. As can be seen in FIG. 4, a liquid drop, 400, contacts a rough substrate, 410, at only certain points (i.e., the raised or roughened points). It will be appreciated that the representations in FIGS. 4 and 6, etc. have been exaggerated for ease of analysis. Thus, for example, the areas represented by 'a' have been presented as uniform, as flat-topped, etc. Cassie's equation can be rearranged to become $$\cos\theta_{CB} = f_{SL}\cos\theta_Y - f_{LA}$$

(5)

where $f_{SL}$ is the fractional coverage of the solid/liquid interface and $f_{LA}$ is the fractional coverage of the liquid/air interface.

It will be appreciated that in such analysis the depth of the roughness on the surface is not a factor in determining the contact angle. However, the width of the "points" of the substrate that touch the liquid and the width between such points (i.e., the width of the liquid/air contact "points") is of importance. See FIG. 4. The increased surface roughness provides a large geometric area for a relatively small geographic area on the substrate. Similar surface roughness on the leaves of the sacred lotus (*Nelumbo nucifera*) can lead to a naturally occurring super-hydrophobicity (contact angle of approximately 170° in some instances). As explained in more detail below, such roughness in the above equations includes nanofibers, e.g., present on a substrate.

Those of skill in the art will be familiar with various means to measure the contact angle of various liquids on surfaces, e.g., with an optical contact angle meter, etc. Other measurements of super-liquidphobicity include sliding angle, e.g., the degree of angle or tilt of a substrate for a liquid drop to slide or move about on the substrate. The super-liquidphobic surfaces herein (e.g., the super-hydrophobic, super-lipophobic, etc. surfaces herein) can display a sliding angle of 5° or less, of 4° or less, of 3° or less, of 2° or less, or even of 1° or less. Again, those of skill in the art will be quite familiar with such concepts and the necessary measurements needed.

Nanofibers

The nanofibers of the invention are optionally constructed through a number of different methods and the examples and discussion listed herein should not be taken as limiting. Thus, nanofibers constructed through means not specifically described herein, but which comprise an exogenous element (e.g., typically a liquidphobic moiety, etc.) and which fall within the super-liquidphobic parameters as set forth herein are still nanofibers of the invention.

In a general sense, and as described previously, the nanofibers of the current invention typically comprise long thin protuberances (e.g., fibers or wires, or even rods, cones, or the like) from a solid substrate (e.g., optionally planar, etc.). Of course, in some embodiments herein, the nanofibers are detached from the substrate on which they are grown and attached to a second substrate, which need not be planar and which, in fact, can comprise a myriad of three-dimensional conformations. In yet other embodiments, the nanofibers of the invention can be patterned on a surface (i.e., in a selected pattern) or grown on a three-dimensional surface of upon a specific area of a three-dimensional surface. Alternatively, nanofibers can be fabricated, in situ, on virtually any shape of substrate using a variety of process known to those of skill in the art.

Figure 7:
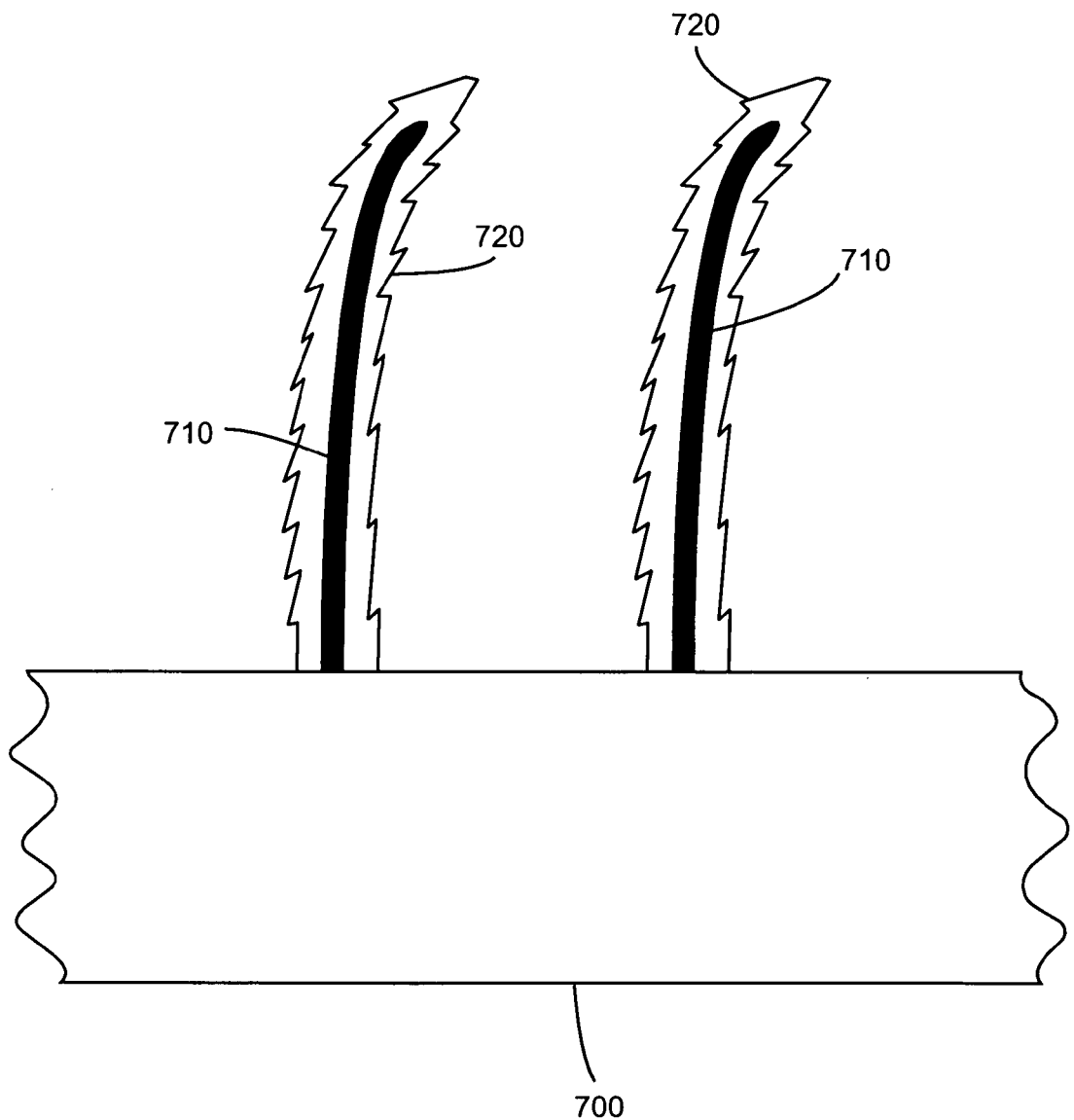
FIG. 7, Displays an illustrative view of coated super-liquidphobic nanofibers of the invention.

FIG. 7 gives a rough cartoon representation of exemplary nanofibers of the invention. In FIG. 7, the nanofibers, 710, are attached to the substrate surface, 700. An exogenous liquidphobic material, 720, is shown "coating" the nanofibers. See below. Again, it will be appreciated that FIG. 7 is merely for illustrative purposes and should not be taken as limiting. For example, the length, diameter, density, shape, composition, etc. of the nanofibers are all optionally quite diverse and can be different in the various embodiments. See below. Additionally, as will be appreciated, the liquidphobic coatings are optionally quite variable as well. Thus, the thickness, composition, application time, and degree of coating (e.g., whether the entire nanofiber is coated, whether only the tip of the nanofiber is coated, etc.) can all optionally vary from embodiment to embodiment in the invention.

Figure 5:
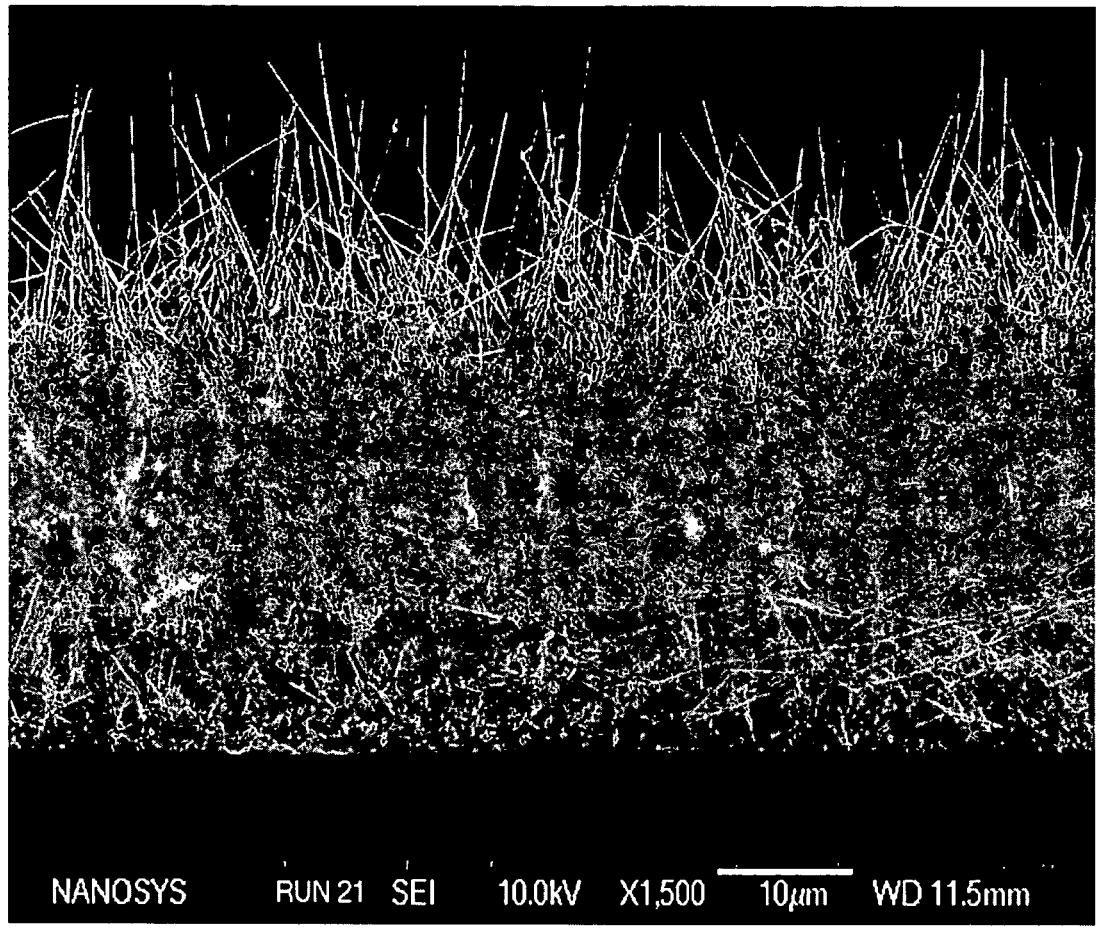
FIG. 5, Displays a photomicrograph of an exemplary nanofiber substrate capable of incorporation into the invention.

As explained in more detail below, however, the actual nanofiber constructions can be much more complex than, e.g., shown in FIG. 6 or 7, etc. For example, FIG. 5 is a photomicrograph of a nanofiber construction similar to the current invention. The image is a SEM cross-section of a nanofiber (here nanowire) surface grown on a silicon wafer. The nanofibers in FIG. 5 have a diameter of about 40 nm and a length of about 40 um. As can be seen in FIG. 5, the nanofibers form a complex three-dimensional mesh or matrix. The interlacing and variable heights, curves, bends, etc. form a "rough" surface which is believed to be intimately involved in the generation of the super-liquidphobicity of the nanofibers herein.

As can be seen from FIG. 7, the nanofibers herein typically comprise a "core" of an inorganic material (typically, but not exclusively silicon and/or a silicon oxide) around which is disposed a liquidphobic "coat." The liquidphobic coat is optionally comprised of any of a number of hydrophobic, lipophobic, amphiphobic, or other liquidphobic materials. See below. The actual coating used can be chosen based on a number of variables such as: cost, ease of use, the liquid that will come into contact with the nanofibers, durability, opaqueness, adhesion of the coat to the core of the nanofibers, shape/density/etc. of the nanofibers, etc. "Exogenous" in such situations typically indicates that the coating is not part of the "core" nanofiber (e.g., is not initially constructed as part of the core). Such coatings are typically applied after the nanofibers are grown and typically comprise a "sheath" or "envelope" layer around the nanofiber core. However, as further described below, such coatings are optionally modifications of the material of the core of the nanofiber. Thus, a major benefit of the current invention is the adaptability and ease of tailoring of the invention to specific uses and conditions. For example, depending upon such factors as the type of liquids to be encountered, durability, toxicity, cost, etc. different coatings can be used on the nanofibers. Also, although described as a sheath or coating, it will be appreciated that such treatment may not always comprise a uniform or homogeneous layer or coating over the entire core, but may, in some instances, be amorphously, periodically or regionally deposited over the nanofiber surfaces.

As is explained in more detail below, numerous liquidphobic coatings are well known to those of skill in the art. It will be appreciated that the invention is not necessarily limited by a specific exogenous liquidphobic coating and the listing herein of specific examples of such should not be necessarily construed as limiting.

Application of the liquidphobic material to the core nanofibers is accomplished in various ways depending upon the specific needs of the material and of the nanofibers, etc. In other words, different liquidphobic materials are attached to different nanofibers in different ways. Binding, depositing, etc. of liquidphobic materials to materials such as silicon (e.g., of which the core nanofibers are often constructed) is well known to those of skill in the art. See, e.g., U.S. Pat. No. 5,464,796 to Brennan, and Arkles, "Silane Coupling Agent Chemistry," Application Note, United Chemical Technologies, Inc. Bristol, Pa. Thus, surface chemical modifications of nanofibers (e.g., of silicon nanofibers) also can create an exogenous coating on the nanofiber. Embodiments exist herein wherein the coating is not a layer on the core per se, but rather is a modification/addition to the surface of the core, e.g., a change of the surface molecules of the core or an addition of other molecules to the surface molecules of the core nanofiber. Additionally, as stated previously, the liquidphobic material coating the nanofiber cores need not entirely coat the nanofibers of the invention in all embodiments. For example, in embodiments wherein the bases of nanofibers are, e.g., embedded in an adhesive or the like, the bases would then not need to be coated.

Density

An aspect of the current invention is the density of the nanofibers, e.g., on the substrate surfaces of the invention. As explained above, super-liquidphobicity of surfaces typically includes the concept of surface roughness. See, e.g., Equations 2-5 above. Therefore, the density of the nanofibers herein, which leads to varying degrees of roughness, is believed to have a bearing on the super-liquidphobicity of the invention. More importantly, the ability to control the density provides a unique ability to control the level of super-liquidphobicity of the overall surface. In essence, the liquidphobicity of the exogenous material, in combination with the nanofiber densities herein, is what is believed to influence to the super-liquidphobicity of the invention.

The concept of density herein is optionally approached in several different ways, all of which are encompassed in the present invention. For example, one definition of nanofiber density consists of the number of nanofibers per unit area of the substrate surface. Different embodiments of the invention can comprise a range of such different densities. The number of nanofibers per unit area can optionally range from about 1 nanofiber per 10 micron$^2$ or less up to about 2000 nanofibers per micron$^2$; from about 1 nanofiber per micron$^2$ or less up to about 1500 nanofibers per micron$^2$; from about 10 nanofibers per micron$^2$ or less up to about 1000 nanofibers per micron$^2$; from about 25 nanofibers per micron$^2$ or less up to about 750 nanofibers per micron$^2$; from about 50 nanofibers per micron$^2$ or less up to about 500 nanofibers per micron$^2$; from about 75 nanofibers per micron$^2$ or less up to about 500 nanofibers per micron$^2$ from about 100 nanofibers per micron$^2$ or less up to about 250 nanofibers per micron$^2$; or from about 125 nanofibers per micron$^2$ or less up to about 175 nanofibers per micron$^2$.

Because in different embodiments the nanofibers herein can optionally comprise different diameters, nanofiber density can also be defined in terms of percent coverage of the substrate surface. In other words, the percentage of the total area of the substrate surface which is taken up by the footprints of the nanofibers themselves. Typically such percentage is determined based upon the nanofiber core. However, in some embodiments, e.g., wherein the exogenous liquidphobic material comprises a thick coating, the percentage is optionally based upon the footprint of the nanofiber core and the exogenous coating. For example, if a nanofiber herein were coated with a thick plastic coating, then the percentage of substrate surface coverage could optionally be determined based upon the diameter of the core nanofiber plus the plastic coating. As will be appreciated, percent surface coverage density is one factor having a bearing upon values in Cassie's equation. See, Equations 4 and 5 above. For example, the values of 'a' in FIG. 4 would change in embodiments wherein a nanofibers comprised a thick coating (thus making the diameter greater) as opposed to an extremely thin coating. Again, however, it will be appreciated that this but one factor in determination of liquidphobicity. In some embodiments, the nanofibers comprise a percent surface coverage of from about 0.01% or less to about 50%; from about 0.25% or less to about 40%; from about 0.5% or less to about 30%; from about 1% or less to about 20%; or from about 5% or less to about 15%.

Yet another aspect of nanofiber density comprises the percentage of coverage determined at a plane above the substrate surface. In some embodiments herein, the nanofibers of the invention comprise bent, curved, or even curled forms. For example, as seen in FIGS. 5 and 6, the nanofibers can optionally form very complex three-dimensional structures. The degree of such complexity depends in part upon, e.g., the length of the nanofibers, the diameter of the nanofibers, the length:diameter aspect ratio of the nanofibers, the coating (if any) of the nanofibers, and the growth conditions of the nanofibers. As can be appreciated, coverage density through one or more planes above the substrate surface (or the "elevated coverage percentage") can optionally be quite different than coverage density at the substrate surface (i.e., the footprint density). Thus, when the plane in question is where a liquid drop interacts/touches the nanofibers the density of such contact/touch points can be different than the footprint density above. In some embodiments, the complexity of the nanofibers produces a greater elevated percentage coverage density than the density at the substrate surface. Such situations can occur because of curled, curved nanofibers (i.e., individual fibers that cross through the imaginary plane more than once).

Figure 6A:
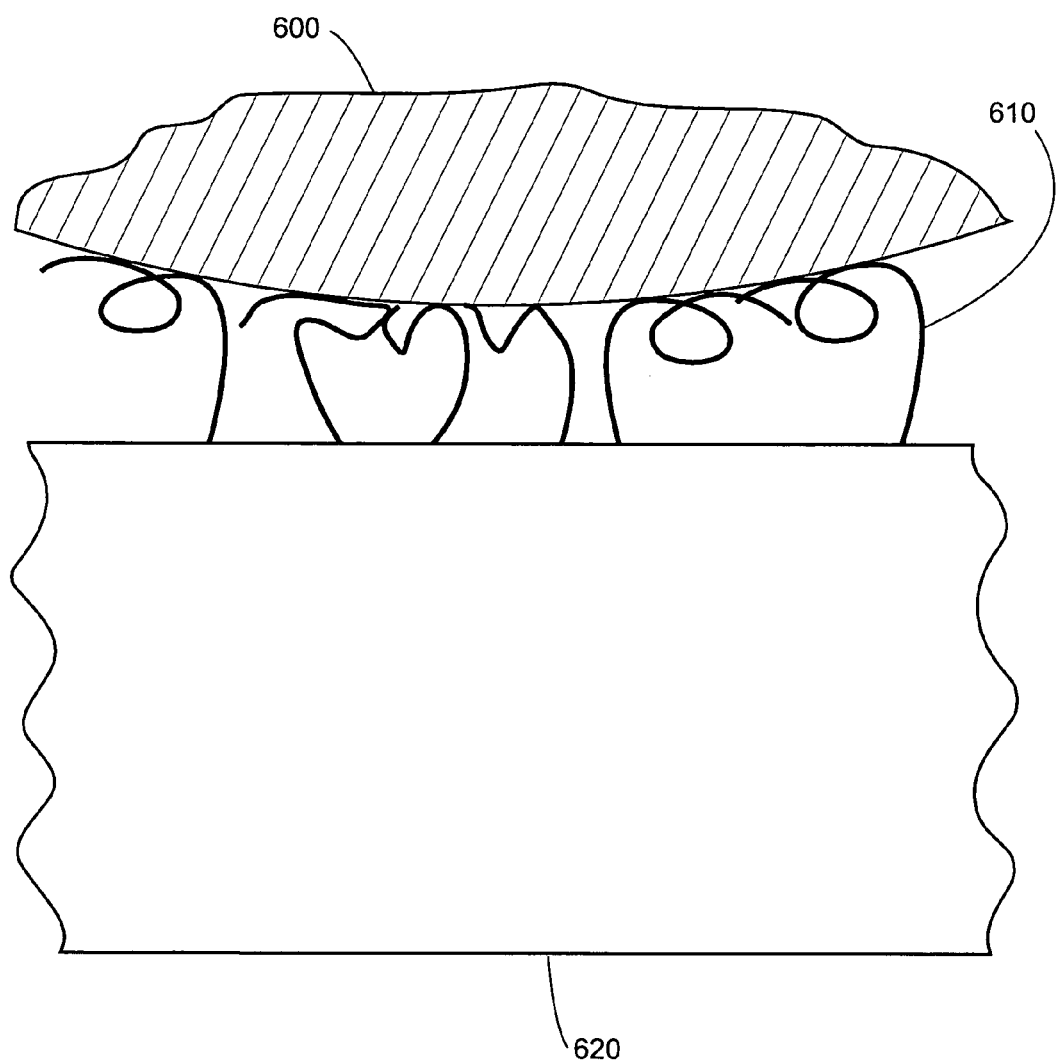
FIG. 6, Panels A and B, Displays schematic representations of liquid drops and nanofiber substrates of the invention.
Figure 6B:
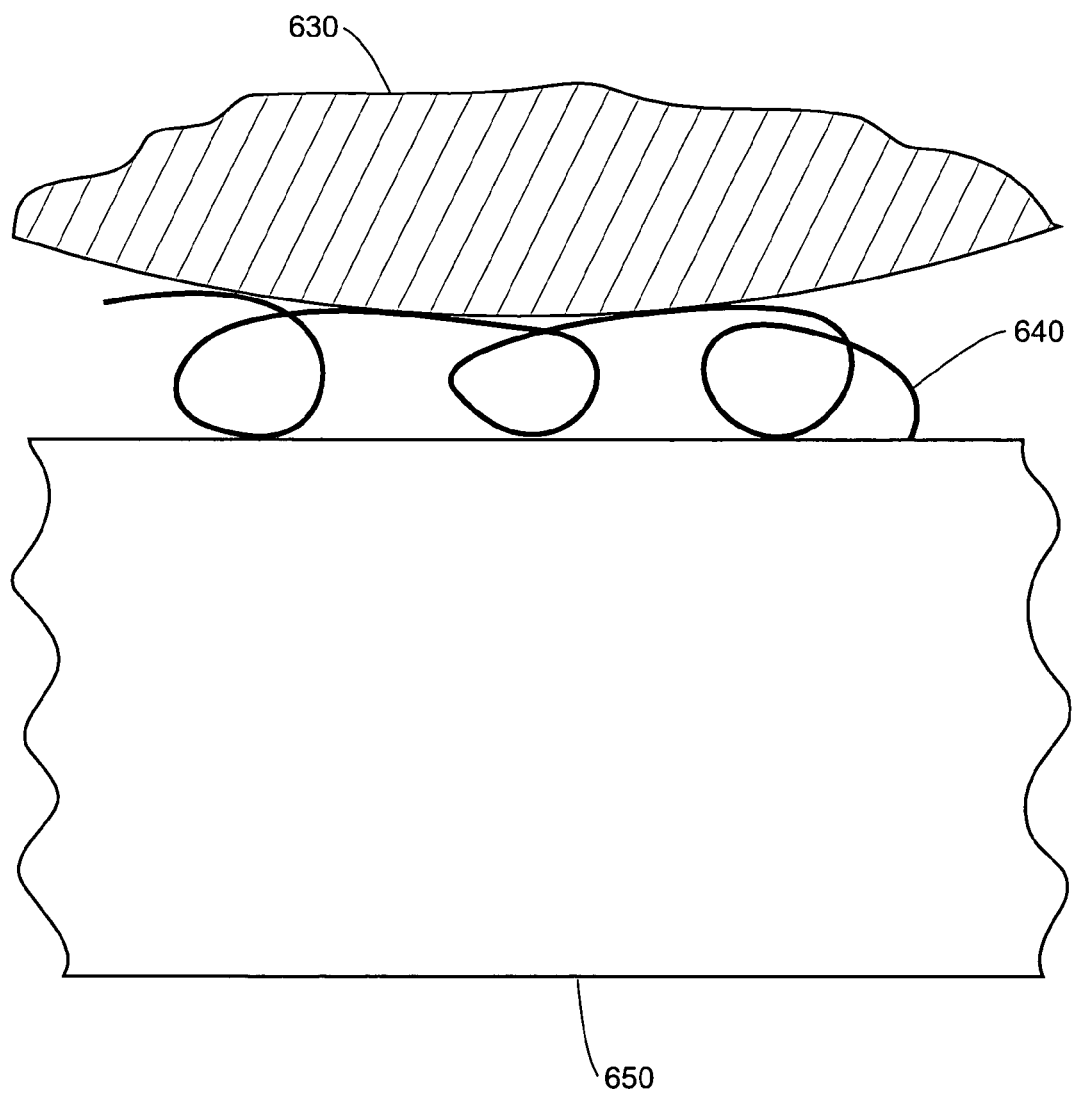

As will be appreciated from the earlier discussion, surface roughness (see, e.g., FIG. 4) can be quite influential in the creation of super-liquidphobicity. Thus, the surface roughness, as determined at various imaginary planes above the substrate surface, is an aspect of the super-liquidphobicity of the nanofibers, etc. of the current invention. For example, a nanofiber which comprised a curled or curved profile (e.g., element 610 in FIG. 6*b*) would have an increased elevated density as compared to "straight" or noncurling/noncurving nanofibers. In relation to the diagram in FIG. 4, such could be viewed as similar to having more 'a' areas if they touch the liquid, etc. FIG. 6*a* displays a liquid drop, 600, resting upon exemplary nanofibers, 610, which can optionally present curved or other nonstraight forms on a substrate, 620. FIG. 6*b* shows a liquid drop, 630, resting upon a long curling nanofiber, 640, on a substrate, 650. As will be apparent, in some embodiments herein, the nanofibers touch a liquid drop with areas other than their tips (e.g., with their sides or with their tips, but at an angle, etc.). Additionally, given the complexity nanofiber arrangements in some embodiments, some nanofibers can touch a liquid drop with their tips while other nanofibers of the same surface can touch the liquid drop with their sides, etc. Again, as explained throughout, such nanofibers, whether straight, curved, curling, etc. comprise exogenous coatings/moieties, etc. in typical embodiments.

The elevated coverage percentage is optionally manipulated in the various embodiments herein through control of the number of nanofibers per unit area as well as through the diameter of the nanofibers (and hence the percentage coverage density) and the length of the nanofibers and the composition, etc. of the nanofibers. Such parameters affect the bending, interlacing, etc. of nanofibers through the elevated plane. Thus, it will be appreciated that the super-liquidphobicity of the nanofiber substrates herein is optionally controlled through manipulation of these parameters in conjunction with the exogenous liquidphobic material added to the nanofibers.

Construction

As will be appreciated, the current invention is not limited by the means of construction of the nanofibers herein. In preferred embodiments, the nanofibers herein typically are composed of an inorganic material, typically silicon and/or silicon oxides and are typically solid, crystalline structures. The formation of inorganic nanofibers is possible through a number of different approaches that are well known to those of skill in the art, all of which are amenable to the current invention. See, e.g., U.S. Pat. Nos. 5,230,957; 5,537,000; 6,128,214; 6,225,198; 6,306,736; 6,314,019; 6,322,901; 6,501,091; and published International Patent Application Nos. WO 02/17632 and WO 01/03208, the full disclosures of each of which are hereby incorporated herein by reference in their entirety for all purposes.

Again, as will be appreciated, the current invention is not limited by the means of construction of the nanofibers herein. For example, typical nanofibers herein are composed of silicon (e.g., they are silicon and/or silicon oxides and are solid and/or non-carbon and/or crystalline). However, again, the use of silicon should not necessarily be construed as limiting. The formation of nanofibers is possible through a number of different approaches that are well known to those of skill in the art, all of which are amenable to the current invention and, thus, are encompassed herein.

Typical embodiments herein can be used with various methods of nanostructure fabrication, as will be known by those skilled in the art, as well as methods mentioned or described herein. For example, the various methods of creating super-liquidphobic nanofibers can be performed using nanofibers made by the methods mentioned or described herein or via other methods. In other words, a variety of methods for making nanofibers and nanofiber containing structures exist, have been described, etc. and can be adapted for use in various of the methods, systems and devices of the invention.

The nanofibers can be fabricated of essentially any convenient material (e.g., a semiconducting material, a ferroelectric material, a metal, etc.) within the current parameters and can comprise essentially a single material or can be heterostructures. For example, the nanofibers can comprise a semiconducting material, for example a material comprising a first element selected from group 2 or from group 12 of the periodic table and a second element selected from group 16 (e.g., ZnS, ZnO, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, BaTe, and like materials); a material comprising a first element selected from group 13 and a second element selected from group 15 (e.g., GaN, GaP, GaAs, GaSb, InN, InP, InAs, InSb, and like materials); a material comprising a group 14 element (Ge, Si, and like materials, such as, e.g., SiC or SiN); a material such as PbS, PbSe, PbTe, AlS, AlP, and AlSb; or an alloy or a mixture thereof. Additional examples, etc. are given throughout.

Some embodiments herein can comprise nanofibers of titanium oxides or of mixtures of titanium oxide(s) and other material. Such mixtures can comprise differing percentages of titanium oxide(s), e.g., from 1% or less to about 20%, from about 2% or less to about 15%, from about 3% or less to about 10%, or from about 4% or less to about 5%. Without being limited to specific modes of action, such titanium oxide nanofibers are thought to interact with ultraviolet light and dirt particles and, thus, keep the super-liquidphobic surfaces clean, etc.

In yet other embodiments, some or substantially all of the nanofibers of the invention can be cross-linked to one or more other nanofiber, e.g., via the exogenous material coating or through other means. Thus, some embodiments can therefore form three dimensional inter-linking complexes or lattices with numerous connections between the nanofibers.

In some typical embodiments herein, the nanofibers are optionally comprised of silicon or silicon oxide. It will be understood by one of skill in the art that the term "silicon oxide" as used herein can be understood to refer to silicon at any level of oxidation. Thus, the term silicon oxide can refer to the chemical structure $SiO_x$, wherein x is between 0 and 2 inclusive.

Some, but by no means all, embodiments herein comprise silicon nanofibers. Common methods for making silicon nanofibers include vapor liquid solid growth (VLS), laser ablation (laser catalytic growth) and thermal evaporation. See, for example, Morales et al. (1998) "A Laser Ablation Method for the Synthesis of Crystalline Semiconductor Nanowires" Science 279, 208-211 (1998). In one example approach, a hybrid pulsed laser ablation/chemical vapor deposition (PLA-CVD) process for the synthesis of semiconductor nanofibers with longitudinally ordered heterostructures is used. See, Wu et al. (2002) "Block-by-Block Growth of Single-Crystalline Si/SiGe Superlattice Nanowires," Nano Letters Vol. 2:83-86.

In general, several methods of making nanofibers and other nanostructures have been described and can be applied in the methods, systems and devices herein. In addition to Morales et al. and Wu et al. (above), see, for example, Lieber et al. (2001) "Carbide Nanomaterials" U.S. Pat. No. 6,190,634 B1; Lieber et al. (2000) "Nanometer Scale Microscopy Probes U.S. Pat. No. 6,159,742; Lieber et al. (2000) "Method of Producing Metal Oxide Nanorods" U.S. Pat. No. 6,036,774; Lieber et al. (1999) "Metal Oxide Nanorods" U.S. Pat. No. 5,897,945; Lieber et al. (1999) "Preparation of Carbide Nanorods" U.S. Pat. No. 5,997,832; Lieber et al. (1998) "Covalent Carbon Nitride Material Comprising $C_2N$ and Formation Method; Thess, et al. (1996) "Crystalline Ropes of Metallic Carbon Nanotubes" Science 273, 483-486; Lieber et al. (1993) "Method of Making a Superconducting Fullerene Composition By Reacting a Fullerene with an Alloy Containing Alkali Metal" U.S. Pat. No. 5,196,396, and Lieber et al. (1993) "Machining Oxide Thin Films with an Atomic Force Microscope: Pattern and Object Formation on the Nanometer Scale" U.S. Pat. No. 5,252,835. Recently, one-dimensional semiconductor heterostructure nanocrystals, have been described. See, e.g., Bjork et al. (2002) "One-dimensional Steeplechase for Electrons Realized" Nano Letters Vol. 2:86-90.

It should be noted that some references herein, while not necessarily specific to nanofibers, are optionally still applicable to the invention. For example, background issues of construction conditions and the like are applicable between nanofibers and other nanostructures. Also some nanostructures, e.g., nanocrystals, etc. are, in some embodiments, optionally comprised within the super-liquidphobic surfaces of the invention (i.e., as or in addition to the super-liquidphobic coated nanofibers).

In a general approach, synthetic procedures to prepare individual nanostructures on surfaces and in bulk are described, for example, by Kong, et al. (1998) "Synthesis of Individual Single-Walled Carbon Nanotubes on Patterned Silicon Wafers," Nature 395, 878-881, and Kong, et al. (1998), "Chemical Vapor Deposition of Methane for Single-Walled Carbon Nanotubes" Chem. Phys. Lett. 292, 567-574. Of course, the current invention is preferably drawn to coated nanofibers as opposed to hollow carbon nanotubes or nanotubules, but again, common methods of construction, etc. overlap.

In yet another approach, substrates and self assembling monolayer (SAM) forming materials can be used, e.g., along with microcontact printing techniques to make nanofibers, such as those described by Schon, Meng, and Bao, "Self-assembled monolayer organic field-effect transistors," Nature 413:713 (2001); Zhou et al. (1997) "Nanoscale Metal/Self-Assembled Monolayer/Metal Heterostructures," Applied Physics Letters 71:611; and WO 96/29629 (Whitesides, et al., published Jun. 26, 1996).

Synthesis of nanostructures, e.g., nanocrystals, of various composition is described in, e.g., Peng et al. (2000) "Shape control of CdSe nanocrystals" Nature 404:59-61; Puntes et al. (2001) "Colloidal nanocrystal shape and size control: The case of cobalt" Science 291:2115-2117; U.S. Pat. No. 6,306,736 to Alivisatos et al. (Oct. 23, 2001) entitled "Process for forming shaped group BIN semiconductor nanocrystals, and product formed using process"; U.S. Pat. No. 6,225,198 to Alivisatos et al. (May 1, 2001) entitled "Process for forming shaped group II-VI semiconductor nanocrystals, and product formed using process"; U.S. Pat. No. 5,505,928 to Alivisatos et al. (Apr. 9, 1996) entitled "Preparation of III-V semiconductor nanocrystals"; U.S. Pat. No. 5,751,018 to Alivisatos et al. (May 12, 1998) entitled "Semiconductor nanocrystals covalently bound to solid inorganic surfaces using self-assembled monolayers"; U.S. Pat. No. 6,048,616 to Gallagher et al. (Apr. 11, 2000) entitled "Encapsulated quantum sized doped semiconductor particles and method of manufacturing same"; and U.S. Pat. No. 5,990,479 to Weiss et al. (Nov. 23, 1999) entitled "Organo luminescent semiconductor nanocrystal probes for biological applications and process for making and using such probes."

Growth of nanofibers, such as nanowires, having various aspect ratios, including nanowires with controlled diameters, is described in, e.g., Gudiksen et al. (2000) "Diameter-selective synthesis of semiconductor nanowires" J. Am. Chem. Soc. 122:8801-8802; Cui et al. (2001) "Diameter-controlled synthesis of single-crystal silicon nanowires" Appl. Phys. Lett. 78: 2214-2216; Gudiksen et al. (2001) "Synthetic control of the diameter and length of single crystal semiconductor nanowires" J. Phys. Chem. B 105:4062-4064; Morales et al. (1998) "A laser ablation method for the synthesis of crystalline semiconductor nanowires" Science 279:208-211; Duan et al. (2000) "General synthesis of compound semiconductor nanowires" Adv. Mater. 12:298-302; Cui et al. (2000)

"Doping and electrical transport in silicon nanowires" *J. Phys. Chem. B* 104:5213-5216; Peng et al. (2000), supra; Puntes et al. (2001), supra; U.S. Pat. No. 6,225,198 to Alivisatos et al., supra; U.S. Pat. No. 6,036,774 to Lieber et al. (Mar. 14, 2000) entitled "Method of producing metal oxide nanorods"; U.S. Pat. No. 5,897,945 to Lieber et al. (Apr. 27, 1999) entitled "Metal oxide nanorods"; U.S. Pat. No. 5,997,832 to Lieber et al. (Dec. 7, 1999) "Preparation of carbide nanorods"; Urbau et al. (2002) "Synthesis of single-crystalline perovskite nanowires composed of barium titanate and strontium titanate" *J. Am. Chem. Soc.,* 124, 1186; Yun et al. (2002) "Ferroelectric Properties of Individual Barium Titanate Nanowires Investigated by Scanned Probe Microscopy" *Nano Letters* 2, 447; and published PCT application Nos. WO 02/17362, and WO 02/080280.

Growth of branched nanostructures (e.g., nanotetrapods, tripods, bipods, and branched tetrapods) is described in, e.g., Jun et al. (2001) "Controlled synthesis of multi-armed CdS nanorod architectures using monosurfactant system" *J. Am. Chem. Soc.* 123:5150-5151; and Manna et al. (2000) "Synthesis of Soluble and Processable Rod-, Arrow-, Teardrop-, and Tetrapod-Shaped CdSe Nanocrystals" *J. Am. Chem. Soc.* 122:12700-12706. Synthesis of nanoparticles is described in, e.g., U.S. Pat. No. 5,690,807 to Clark Jr. et al. (Nov. 25, 1997) entitled "Method for producing semiconductor particles"; U.S. Pat. No. 6,136,156 to El-Shall, et al. (Oct. 24, 2000) entitled "Nanoparticles of silicon oxide alloys"; U.S. Pat. No. 6,413,489 to Ying et al. (Jul. 2, 2002) entitled "Synthesis of nanometer-sized particles by reverse micelle mediated techniques"; and Liu et al. (2001) "Sol-Gel Synthesis of Free-Standing Ferroelectric Lead Zirconate Titanate Nanoparticles" *J. Am. Chem. Soc.* 123:4344. Synthesis of nanoparticles is also described in the above citations for growth of nanocrystals, nanowires, and branched nanowires.

Synthesis of core-shell nanostructures, e.g., nanostructure heterostructures, are described in, e.g., Peng et al. (1997) "Epitaxial growth of highly luminescent CdSe/CdS core/shell nanocrystals with photostability and electronic accessibility" *J. Am. Chem. Soc.* 119:7019-7029; Dabbousi et al. (1997) "(CdSe)ZnS core-shell quantum dots: Synthesis and characterization of a size series of highly luminescent nanocrystallites" *J. Phys. Chem. B* 101:9463-9475; Manna et al. (2002) "Epitaxial growth and photochemical annealing of graded CdS/ZnS shells on colloidal CdSe nanorods" *J. Am. Chem. Soc.* 124:7136-7145; and Cao et al. (2000) "Growth and properties of semiconductor core/shell nanocrystals with InAs cores" *J. Am. Chem. Soc.* 122:9692-9702. Similar approaches can be applied to growth of other core-shell nanostructures. See, for example, U.S. Pat. No. 6,207,229 (Mar. 27, 2001) and U.S. Pat. No. 6,322,901 (Nov. 27, 2001) to Bawendi et al. entitled "Highly luminescent color-selective materials."

Growth of homogeneous populations of nanofibers, including nanowire heterostructures in which the different materials are distributed at different locations along the long axis of the nanowires is described in, e.g., published PCT application Nos. WO 02/17362, and WO 02/080280; Gudiksen et al. (2002) "Growth of nanowire superlattice structures for nanoscale photonics and electronics" *Nature* 415:617-620; Bjork et al. (2002) "One-dimensional steeplechase for electrons realized" *Nano Letters* 2:86-90; Wu et al. (2002) "Block-by-block growth of single-crystalline Si/SiGe superlattice nanowires" *Nano Letters* 2, 83-86; and U.S. patent application publication 2004/0026684 (pending) to Empedocles entitled "Nanowire heterostructures for encoding information." Similar approaches can be applied to growth of other heterostructures and applied to the various methods and systems herein.

The present invention also optionally can be used with structures that may fall outside of the size range of typical nanostructures. For example, Haraguchi et al. (U.S. Pat. No. 5,332,910) describe nanowhiskers which are optionally used herein. Semi-conductor whiskers are also described by Haraguchi et al. (1994) "Polarization Dependence of Light Emitted from GaAs p-n junctions in quantum wire crystals" *J. Appl. Phys.* 75(8): 4220-4225; Hiruma et al. (1993) "GaAs Free Standing Quantum Sized Wires," *J. Appl. Phys.* 74(5): 3162-3171; Haraguchi et al. (1996) "Self Organized Fabrication of Planar GaAs Nanowhisker Arrays, and Yazawa (1993) "Semiconductor Nanowhiskers" *Adv. Mater.* 5(78):577-579. Such nanowhiskers are optionally employed as the nanofibers components of the surfaces of the invention.

One example of a method of fabrication of nanofibers is found in the method described by Wu, in which a modified pulse laser ablation/chemical vapor deposition (PLA-CVD) process is used to produce nanofibers (e.g., nanowires). Again, it is to be emphasized that this illustration is but one way of construction of super-liquidphobic nanofibers of the invention and should not be taken as limiting. In such method, a silicon wafer coated with a thin layer of gold is placed inside a quartz furnace tube as a substrate. A gas mixture of $H_2$ and $SiCl_4$ is then continuously introduced into the reaction tube. Nanofiber growth occurs through a modified vapor-liquid-solid mechanism with gold as solvent at high temperature.

The nanofiber growth process starts with the dissolution of gaseous reactants in nanosized liquid droplets of the metal solvent, followed by nucleation and growth of single crystalline fibers. Accurate compositional profile and interface control at the nanometer or even atomic level while maintaining a highly crystalline and coherent interface along the fiber axis is made possible through successive feed-in of different vapor sources. To synthesize a mixed construction nanofiber, e.g., Si/SiGe nanowires, Ge vapor is optionally generated in pulsed form through the pulsed ablation of a pure Ge target with a frequency-doubled laser.

The reaction temperature in such nanowire production methods typically ranges from about 850° C. to about 950° C. At such temperatures, a thin gold film forms a liquid alloy with silicon and spontaneously breaks up into nanometer-sized droplets. Silicon species continuously deposit into gold-silicon droplets where the silicon nanowire growth is initiated upon supersaturation. During this growth process, if the laser is turned on, Ge vapor is generated and, thus, both Ge and Si species are deposited into the alloy droplets. The SiGe alloy then precipitates from the solid/liquid interface. The dopant and/or the gas can be varied to alter the composition of the nanowire (e.g., other alloys instead of SiGe re also possible).

While the above example comprising silicon is a typical embodiment, again, as previously stated, other materials can optionally be used. For example, the silicon substrate can be replaced with another material (e.g., inorganic), including, but not limited to one or more materials selected from groups II, III, IV, V, or VI of the periodic table of combinations and/or alloys thereof. Additionally, the dopant can also be a material including, but not limited to one or more materials selected from groups II, III, IV, V, or VI of the periodic table or various combinations and/or alloys thereof.

The size (e.g., diameter) and/or shape of the nanofiber can optionally be determined by the size of the gold (or other catalyst) droplet on the substrate. The use of colloidal catalysts (see, e.g., Gudiksen et al., supra) has been shown to significantly improve control of nanofiber diameter and uniformity. Size of the catalyst droplet can also be varied by selective deposition of the gold, or other catalyst, droplets on the substrate (e.g., via molecular beam processes, lithographic processes, and the like). Similarly the distribution of nanofibers on the substrate can be governed by the distribution of the gold or other catalyst on the substrate.

It will be noted that no matter the production process, in preferred embodiments, the nanofibers herein typically comprise "solid" nanofibers, i.e., not having a hollow core. Thus, the nanofibers herein preferably are typically not structurally similar to carbon nanotubules or nanotubes. See supra.

Additionally, while the nanofibers of the invention can generally be produced in situ, e.g., upon the surface for which they are desired, as described previously, the nanofibers of the invention can optionally be grown on a first substrate surface, e.g., through the process described above or a similar method, and then transferred to one or more secondary substrate surface. For example, nanofibers of the invention could be transferred from a silicon wafer on which they were grown to the interior wall of a glass vessel. The exogenous liquidphobic material, e.g., silane or the like, used to 'coat' the nanofibers is optionally deposited either before such transfer to the secondary surface or after transfer.

In embodiments wherein nanofibers are transferred from one surface (e.g., the surface upon which they were grown) to a second surface (e.g., a surface where they are to be used), the nanofibers can optionally be "harvested" in any of a number of ways. It will be appreciated by those of skill in the art that such methods of fiber transfer are not to be considered limiting. For example, nanofibers can be harvest by applying a sticky coating or material to a layer of nanofibers on a first surface and then peeling such coating/material away from the first surface. The sticky coating/material is then optionally placed against a second surface to deposit the nanofibers. Examples of sticky coatings/materials which are optionally used for such transfer include, but are not limited to, e.g., tape (e.g., 3M Scotch® tape), magnetic strips, hardening cements (e.g., rubber cement and the like), etc. Other methods include casting a polymer material onto the nanofibers, thus forming a sheet, and peeling off the sheet. Such sheet is then transferred (with optional subsequent removal of the polymer via selective etching) to a second surface. Furthermore, some embodiments comprise coating or painting a slurry or solution of nanofibers onto a secondary surface where the concentration in the solution is high enough to achieve the desired nanofiber density. In such embodiments, the liquidphobic coating can optionally be applied to the nanofibers after they have been deposited on the second surface or prior to such transfer/deposit.

Liquidphobic Coatings

In typical embodiments herein, the super-liquidphobic nanofibers of the invention comprise an exogenous liquidphobic material (e.g., a hydrophobic material, a lipophobic material, an amphiphobic material, etc.). Typically, such material takes the form of a "coating" of the nanofibers of the invention. However, in other embodiments herein, the nanofibers are not coated in a traditional sense in that they have a layer, or coat, of chemical covering the entire nanofiber. For example, some embodiments comprise wherein the nanofibers of the invention are treated with a component (e.g., chemical(s), laser(s), exposure to ambient conditions, etc.) which optionally alters the surface of the nanofiber, thus making it super-liquidphobic, but which doesn't coat or envelope the surface of the nanofiber in a traditional sense. In some such embodiments, the changed surface of the nanofiber can be termed as a coating.

In typical embodiments, however, the "core" of the nanofiber, e.g., the, typically silicon, fiber itself, acts as a scaffold or the like for the liquidphobic coating. See, e.g., FIG. 7. It will be appreciated by those of skill in the art that the current invention is not limited by the type of liquidphobic aspect associated with the nanofibers. In other words, the actual chemical composition, etc. of the liquidphobic coating (or even the steps involved in a non-chemical treatment resulting in super-liquidphobicity, see, above) are not to be taken as necessarily limiting. Such coatings, etc. are optionally changed and/or chosen based upon a number of parameters, e.g., the liquid to be repelled, the conditions under which the nanofibers are to be used, cost, ease of application, toxicity, eventual use of the nanofibers, durability, etc. and are all within the parameters of the current invention.

In some embodiments herein, the nanofibers of the invention are comprised of multiple coatings of liquidphobic compounds or are comprised through multiple treatments which result in liquidphobicity. Additionally, in other embodiments, the nanofibers are subjected to treatment/coating/etc. with compounds and/or treatments which of themselves do not produce super-liquidphobicity, but which are intermediaries in a process leading to the final super-liquidphobicities of the nanofibers of the invention.

Also, it will be appreciated that in some embodiments herein, the super-liquidphobic nanofibers of the invention comprise substances (e.g., the coatings, etc.) that in isolation, or when not existing as a component of the nanofibers of the invention, are not liquidphobic at all, or are only mildly liquidphobic. In other words, the super liquidphobicity, thus, only arises upon the combination of the nanofibers and the exogenous aspect associated with them (e.g., the chemical coating, application, etc.).

Examples of liquidphobic compounds which are capable of use in the current invention are given in Table 1. Once again, such listed examples are only for illustrative purposes and should not be taken as necessarily limiting to the invention. Other examples of compounds which are used to treat surfaces and which are liquidphobic and which optionally are used with the nanofibers herein are well known to those of skill in the art. For example, listed liquidphobic compounds (including, e.g., hydrophobic, lipophobic, amphiphobic compounds, etc.) are found in common commercial sources such as chemical catalogues from, e.g., United Chemicals, Sigma-Aldrich, etc. For example, in some'embodiments herein, the nanofibers are, e.g., methylated (e.g., by treatment with a methylating agent, etc.), fluorinated, treated with a fluoroalkylsilane group, etc. Some embodiments herein comprise nanofiber coatings of, e.g., Teflon®, silicon polymers (e.g., Hydrolam 100®), polypropylene, polyethylene, wax (e.g., alkylketene dimers, paraffin, fluorocarbon wax, etc.), plastic (e.g., isotactic polypropylene, etc.), PTFE (polytetrafluoroethylene), compounds created through treatment with silane agents, heptadecafluorodecyltrichlorosilane, perfluorooctyltriclorosilane, heptadecafluorodecyltrimethoxysilane, perfluorododecyltrichlorosilane, polyvinyliden fluoride, polyperfluoroalkyl acrylate, octadecanethiol, fluorine compounds (e.g., graphite fluoride, fluorinated monoalkyl phosphates, $C_4F_8$, etc.). Other sample exogenous compounds optionally used in various embodiments herein (whether as the coating itself or to form the coating) can be found in Table 1.

TABLE 1

| Liquidphobicity | Functionality | Chemical Name |
|---|---|---|
| Hydrophobic | C2 | Ethyltrichlorosilane |
| Hydrophobic | C2 | Ethyltriethoxysilane |
| Hydrophobic | C3 | n-Propyltrichlorosilane |
| Hydrophobic | C3 | n-Propyltrimethoxysilane |
| Hydrophobic | C4 | n-Butyltrichlorosilane |
| Hydrophobic | C4 | n-Butyltrimethoxysilane |
| Hydrophobic | C6 | n-Hexyltrichlorosilane |
| Hydrophobic | C6 | n-Hexyltrimethoxysilane |
| Hydrophobic | C8 | n-Octyltrichlorosilane |
| Hydrophobic | C8 | n-Octyltriethoxysilane |
| Hydrophobic | C10 | n-Decyltrichlorosilane |
| Hydrophobic | C12 | n-Dodecyltrichlorosilane |
| Hydrophobic | C12 | n-Dodecyltriethoxysilane |
| Hydrophobic | C18 | n-Octadecyltrichlorosilane |
| Hydrophobic | C18 | n-Octadecyltriethoxysilane |
| Hydrophobic | C18 | n-Octadecyltrimethoxysilane |
| Hydrophobic | C18 | Glassclad-18 |
| Hydrophobic | C20 | n-Eicosyltrichlorosilane |
| Hydrophobic | C22 | n-Docosyltrichlorosilane |
| Hydrophobic | Phenyl | Phenyltrichlorosilane |
| Hydrophobic | Phenyl | Phenyltriethoxysilane |
| Amphiphobic | Tridecafluorooctyl | (Tridecafluoro-1,1,2,2,-tetrahydroocty1)-1-trichlorosilane |
| Amphiphobic | Tridecafluorooctyl | (Tridecafluoro-1,1,2,2,-tetrahydroocty1)-1-triethoxysilane |
| Amphiphobic | | Fluorinated alkanes |
| | | Fluoride containing compounds |
| | | Alkoxysilane |
| | | PTFE |
| | | hexamethyldisilazane |
| | | Aliphatic hydrocarbon containing compounds |
| | | Aromatic hydrocarbon containing compounds |
| | | Halogen containing compounds |
| | | Paralyene and paralyene derivatives |
| | | Fluorosilane containing compounds |
| | | Fluoroethane containing compounds |

As previously stated, some embodiments herein can comprise nanofibers of titanium oxide(s) or of mixtures of titanium oxide(s) and other materials. Alternatively, and/or additionally, some embodiments herein also can comprise exogenous coatings of titanium oxide(s) or mixtures of titanium oxide(s). Such mixtures can comprise differing percentages of titanium oxide(s), e.g., from 1% or less to about 20%, from about 2% or less to about 15%, from about 3% or less to about 10%, or from about 4% or less to about 5%, etc. It will be appreciated that exogenous materials comprising titanium oxide(s) can be associated with nanofibers comprising titanium oxide(s) or with nanofibers which do not comprise titanium oxide(s). Without being limited to specific modes of action, such titanium oxide exogenous materials are thought to interact with ultraviolet light and dirt particles and, thus, keep the super-liquidphobic surfaces clean, etc.

Methods of Use/Applications

The super-liquidphobic surfaces, etc. of the current invention are optionally used in a huge number of different applications. Basically whenever a super-liquidphobic surface is desired, the current invention can optionally be utilized. It will be appreciated, therefore, that specific uses/methods/etc. Claimed or described herein are illustrative, but not limiting. Thus, other non-described uses/methods comprising the current nanofibers and/or their usage are also features of the invention. A number of further examples of uses of nanofiber surfaces, e.g., in medical applications, etc., can be found in, e.g., U.S. Ser. No. 10/792,402 filed Mar. 2, 2004 (pending), entitled "Nanofiber Surfaces for Use in Enhanced Surface Area Applications"; U.S. Ser. No. 10/902,700, filed Jul. 29, 2004 (pending), entitled "Medical Device Applications of Nanostructured Surfaces"; and U.S. Ser. No. 10/941,746, filed Sep. 15, 2004 (pending), entitled "Porous Substrates, Articles, Systems and Compositions Comprising Nanofibers and Methods of Their Use and Production".

The super-liquidphobic nanofiber substrates of the invention can optionally be employed in containers (e.g., for drugs or costly liquids) where volume loss or retention is of utmost concern. For example, drug delivery devices can optionally be constructed which have nanofiber surfaces of the invention. Such drug delivery devices could help ensure that a full proper dosage of drug is delivery each application. Also, various devices (e.g., capillaries and/or microfluidic devices) which have small volumes are also optionally coated with the nanofiber substrates of the invention in order to prevent/reduce fluid retention, prevent/reduce fluid drag, etc.

A number of valuable applications for the invention rely upon the ability of the substrate surfaces of the invention to easily shed or slide water or other liquids off the surface. By way of example, where a surface is continuously or regularly flowed over by liquids, the substrates of the invention can be used to substantially reduce any viscous drag or fluid friction on such surfaces. In at least one embodiment, fluidic conduits are provided with surfaces of the invention to reduce fluidic drag through such conduits, thus dramatically reducing power requirements for pumping fluids through the conduit. Similarly, aquatic or marine vessels can be provided with surfaces of the invention at the point of interface with the water, e.g., on the hull of a boat, to reduce the level of viscous drag on that interface. Such a reduction in drag results in a dramatic increase in the efficiency of the vessel, allowing increased speed, fuel efficiency and the like. Because the materials described herein are optionally produced in situ, e.g., on the walls of a conduit, or transferred to a secondary surface, e.g., the hull of a boat, they are readily applicable to such, and many other, applications.

Additionally, the current invention can optionally be used as a liquid repellant on surfaces such as mirrors, windows, windshields, and the like to repel water and/or snow or ice. Thus, in some embodiments herein the nanofiber structures and their exogenous compound(s) are transparent, semi-transparent, translucent, semi-translucent, etc. in order to allow visibility through the nanofiber coated substrate. Additionally, in these and other embodiments, the nanofiber surfaces herein can optionally be self-cleaning due to movement of beads of liquid (e.g., water) over the nanofiber surfaces. The beads can thus optionally pick up deposited dirt, etc. that would otherwise mar or accumulate on the nanofiber surface.

Other applications of the invention can comprise use in cooking implements, e.g., pots, pans, cooking vessels, etc. to prevent sticking of foodstuffs and to allow easier cleaning of such vessels. Those of skill in the art will be quite familiar with similar applications based upon Teflon® coatings of current cookware.

Other applications of the invention comprise use to prevent/reduce snow or ice build-up on structures. For example, ice on aircraft surfaces, especially the wings and stabilizers, can cause loss of lift and/or control. Aircraft on the ground must have ice removed before takeoff and aircraft in flight must avoid icing conditions or have anti-icing or de-icing equipment on board. The super-liquidphobic surfaces of the invention are optionally used to prevent such icing because they are not "wetted" by liquid. In some such embodiments, air is optionally pumped through the surfaces (optionally heated air). In yet other embodiments, the surfaces themselves are also heated. Currently some plane fuselages are heated, but with super-liquidphobic coatings, the amount of heat needed is optionally less because only the ice in contact with the nanofibers would need to be melted since the super-liquidphobicity of the surface would allow the easy removal of any unmelted ice. Other surfaces besides plane bodies are also required to stay ice/snow free. Antennas, telecommunication dishes, road signs, roof eaves, gutters, vehicle windows/mirrors, etc. all optionally benefit from the super-liquidphobic nanofibers of the invention.

The invention also optionally finds use in textile manufacture (e.g., in construction of stain resistant fabrics and the like or in the construction of types of woven or other textile format medical devices to prevent cell and/or bacterial growth). For example, rain gear (e.g., raincoats and the like) whether woven or not, can optionally comprise the super-liquidphobic nanofibers of the invention.

The invention also has great applications in aesthetic situations. Sculptures, graphic lettering, toys, consumer goods, etc. all optionally can utilize aspects of the current invention. For example, graphic lettering comprised of superhydrophobic surfaces of the invention are optionally used to form writing in fountains, etc.

Applications involving such constructs as barrier layers for waste ponds and underground storage tanks are also contemplated. Waste ponds are typically lined with an impermeable layer, such as clay, to prevent toxic materials from leaching into the ground below. Underground tanks require double walls for the same purpose. A super-liquidphobic material of the invention is optionally used on the surface of a membrane (e.g., a plastic sheet) or mixed with another material (e.g., a clay or concrete barrier) to form a tough impermeable layer. A similar use also optionally occurs with lining of canals and water pipes, etc. to help in water transport in areas where canal/aqueduct leakage is a major concern.

The current invention is also optionally utilized in building materials. For example, as mentioned above, the super-liquidphobic nanofibers of the invention are optionally applied to shingles, gutters, etc. to help prevent/reduce ice and snow accumulation. Additionally, the super-liquidphobic materials herein are optionally incorporated into building materials to prevent water intrusion (e.g., shingles, siding, house-wraps, underground concrete foundations, etc.). Such material optionally could allow gas-phase passage of air and/or water vapor, but prevent water intrusion. Similar applications can optionally provide anti-fouling surfaces that prevent mold/mildew formation in humid areas. The super-liquidphobic materials are also optionally used to reduce or eliminate grease/oil build-up in, e.g., kitchen areas (especially commercial kitchens, engines (e.g., in cars, generators, etc.), or other areas where oil and/or grease may accumulate. Thus, embodiments of the invention can be used to prevent/reduce intrusion of a liquid (e.g., water, lipids such as grease, etc.) into an area.

Other applications of the current invention optionally utilize the layer of gas/liquid trapped between a liquid/gas and the substrate surface (e.g., a gas/liquid dispersed amongst or between the nanofibers and a gas/liquid disposed upon/above the nanofiber layer). For example, exchange between the two media can optionally occur. Such exchange can be of various compounds, constituents, etc. in the media (e.g., the gas or liquid) or can be exchange of heat, etc. See below. In some embodiments, the nanofiber substrate comprises a porous layer, thus media flow (or constituents thereof) on the side of the substrate opposite the nanofiber layer can diffuse through the substrate and nanofiber layer to reach the other media. In embodiments wherein the substrate is gas/liquid impermeable, flow can be parallel to the surface of the nanofiber substrate and "flow" between the nanofibers themselves, e.g., within the interstitial areas between the nanofibers. Applications for such exchanges can optionally include, e.g., artificial lungs (e.g., blood as the liquid and air or oxygen as the gas diffusing in), chemical reactors, bioreactors (e.g., with $O_2$ and $CO_2$ as the diffusing species), sewage disposal, etc.

The current invention is also optionally used in platen printing. For example, a pattern comprised of liquidphobic areas surrounded by super-liquidphobic areas can optionally provide a method of printing or transferring ink in a desired pattern. The ink could optionally comprise not only traditional pigments, but also, e.g., oligonucleotides for sequencing arrays, nanofiber suspensions for deposition into macroelectronic arrays, etc. The ink would tend to position itself on the liquidphobic areas (i.e., be repelled from the super-liquidphobic areas). Such positioning is commonly done by patterns of hydrophobic and hydrophilic regions. However, using liquidphobic/super-liquidphobic patterns provides the advantage that the liquidphobic areas are likely to have very little contamination from the ink and could be used repeatedly with different compounds with little cross-contamination. However, rather than patterns of solely liquidphobic and super-liquidphobic areas, other embodiments can comprise various pattern combinations of hydrophobic areas, lipophobic areas, amphiphobic areas, super-hydrophobic areas, super-lipophobic areas, and super-amphiphobic areas. For example, some embodiments can optionally comprise patterns of super-hydrophobic and super-lipophobic areas, etc. The patterning of the platen is optionally done by laser ablation of a uniform field of nanofibers followed by uniform treatment of the surface to be liquidphobic. Thus, the liquidphobic surface where there are no nanofibers will be produced in addition to the super-liquidphobic surface where the nanofibers remain. Thus, aspects of the invention can comprise methods of printing by providing super-liquidphobic nanofiber surfaces, etching or removing one or more prescribed area of nanofibers within the surface area (thus producing a patterned area of super-liquidphobic substrate and a patterned area of bare surface not comprising nanofibers), and, contacting the substrate to a second substrate, thus transferring the ink or dye, etc. to the second substrate in a pattern corresponding to the patterned area of bare surface. The invention can also comprise methods of patterning a surface through providing at least one substrate with one or more surface area comprising a plurality of nanofibers (e.g., non-carbon and/or solid and/or crystalline nanofibers) wherein the nanofibers are treated with one or more material, thereby producing a super-liquidphobic substrate; and, etching or removing one or more prescribed area of nanofibers within the surface area, thus producing a patterned area of super-liquidphobic substrate and a patterned area of bare surface not comprising nanofibers.

Yet another optionally use of the current invention involves production of non-fouling boilers or heat exchangers. Heat exchangers that comprise liquids, work very efficiently when local boiling occurs at imperfections on the exchanger wall. The heat of evaporation is typically much larger than the heat capacity of the liquid. Once a bubble grows large enough, it separates form the surface and transfers the heat into the bulk of the working fluid. A densely packed nanofiber surface can be viewed as having an abundance of imperfections or nucleation sites for local boiling. Additionally, the super-liquidphobicity of the nanofibers ensures that very little liquid contact occurs at the wall itself. Thus, the heat exchanger would have very little tendency for fouling even with dirty liquids. Furthermore, caustic or corrosive materials would present less of a problem for the exchanger walls. The nanofibers on the walls could also optionally comprise sites for drop nucleation to create a useful condenser surface (e.g., a heat exchanger for transferring heat out of a working fluid). The super-liquidphobic surface would also tend to discourage contaminant growth.

In yet other embodiments of the invention, super-liquidphobic nanofiber surfaces can be utilized for optical properties as well. For example, a super-hydrophobic nanofiber surface can be immersed into an aqueous liquid. A layer of air trapped/contained between the nanofibers (e.g., in the interstitial spaces between the nanofibers) can become reflective when the surface is turned at an angle (e.g., 45 degrees) from a viewer. Similar devices are also optionally constructed with differing liquids and phobicities. Such trapped thin layers of gasses can also be utilized in acoustical dampening, low adsorption containers, low adhesion cell growth layers, and low resistance fluid flow layers. See above as well.

The above are illustrative of various uses/applications of the super-liquidphobic nanofiber and nanofiber constructs of the invention. Again, the enumeration of specific embodiments herein is not to be taken as necessarily limiting on other non-detailed uses/applications which comprise the super-liquidphobic nanofiber/nanofiber structures of the current invention. Those of skill in the art will appreciate other possible applications and uses of the super-liquidphobic surfaces and methods herein.

In some embodiments, the invention provides kits for practice of the methods described herein which optionally comprise the substrates of the invention. In various embodiments, such kits comprise a container or containers with one or more of the following: a super-liquidphobic substrate as described herein, or a device comprising a super-liquidphobic substrate.

The kit can also comprise any necessary reagents, devices, apparatus, and materials additionally used to fabricate super-liquidphobic nanofibers, to assemble nanofiber structures and the like.

In addition, the kits can optionally include instructional materials containing directions (i.e., protocols) for the synthesis and/or coating and/or use of super-liquidphobic nanofiber structures. Instructional materials can include written material (e.g., in the form of printed material, material stored on CD, computer diskette, DVD, or the like) as well as access to an Internet site that contains the appropriate instructions. Preferred instructional materials give protocols for utilizing the kit contents (e.g., to perform any of the assays/methods/uses described herein).

In certain embodiments, the instructional materials teach the use of the nanofiber substrates of the invention in the construction of one or more devices such as, e.g., liquid transport/storage devices, ice/water resistant devices, etc.

EXAMPLES

Example 1

Construction of Super Hydrophobic Nanofiber Substrates

A four inch silicon wafer with an oxide surface was constructed with silicon nanofibers (here nanowires) on its surface. The nanowires were grown through a gold colloid initiated CVD process. The wires varied in length from several microns to about 100 microns and were approximately 500 nanometers in width. Drops of water applied to this surface rapidly wicked and spread until the voids between the nanowires were filled.

Similar wafers were treated in two ways. First a nanowire containing wafer was immersed in Tri-Sil® (Pierce Chemical) for two hours and then washed with DMF and ethanol and water. The wafer was then blown dry. A second wafer (this one of 5 cm$^2$) was immersed in a 1% solution of tridecafluoro-1,1,2,2-tetrahydrooctyl-1-trichlorosilane in chloroform. The second wafer was washed with fresh chloroform and blown dry.

Figure 8:
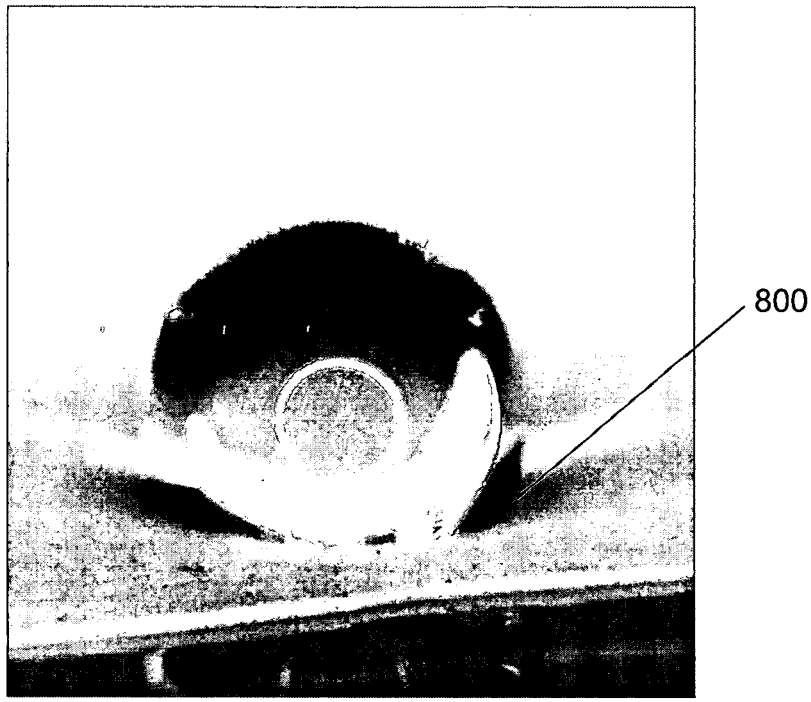
FIG. 8, Displays a photograph of a liquid drop on porous Teflon® tape.
Figure 9:
FIG. 9, Displays a photograph of a liquid drop on a fluorinated silicon surface.
Figure 10:
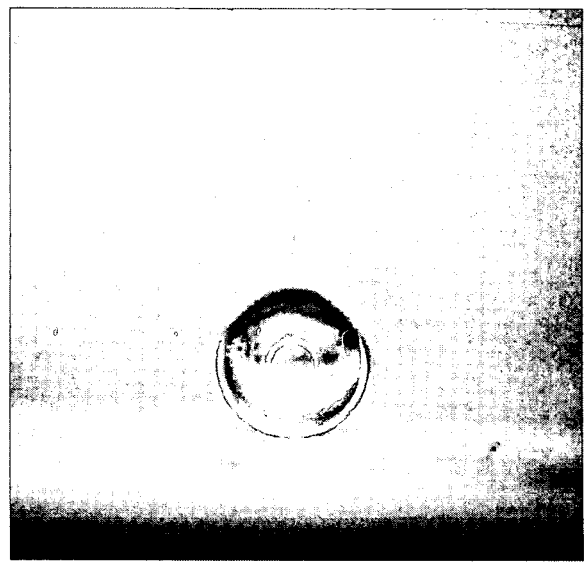
FIG. 10, Displays a photograph of a liquid drop on a fluorinated nanofiber surface of the invention.
Figure 11:
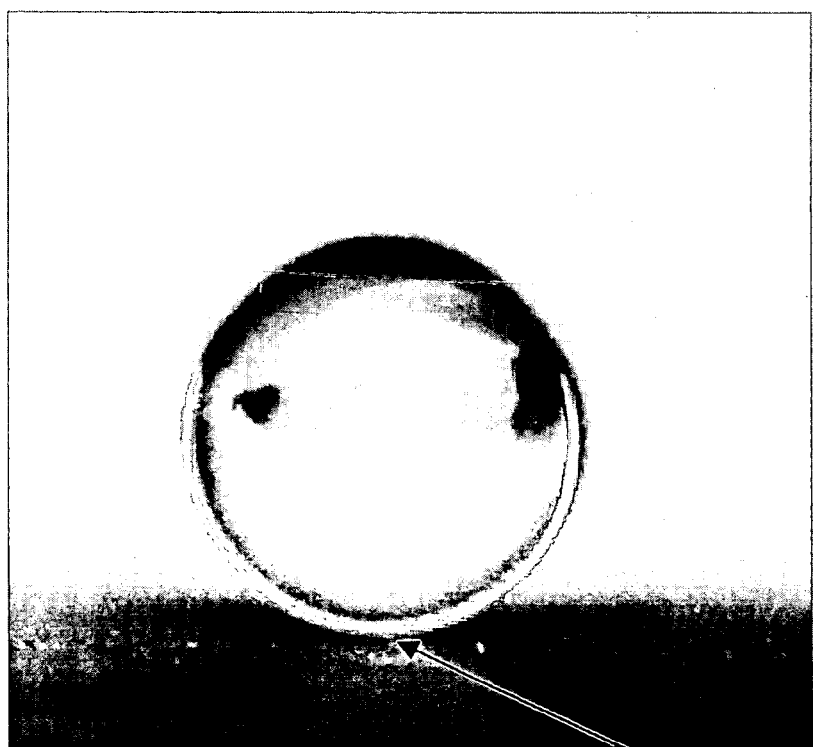
FIG. 11, Displays a photograph of a liquid drop on a fluorinated nanofiber surface of the invention.
Figure 12:
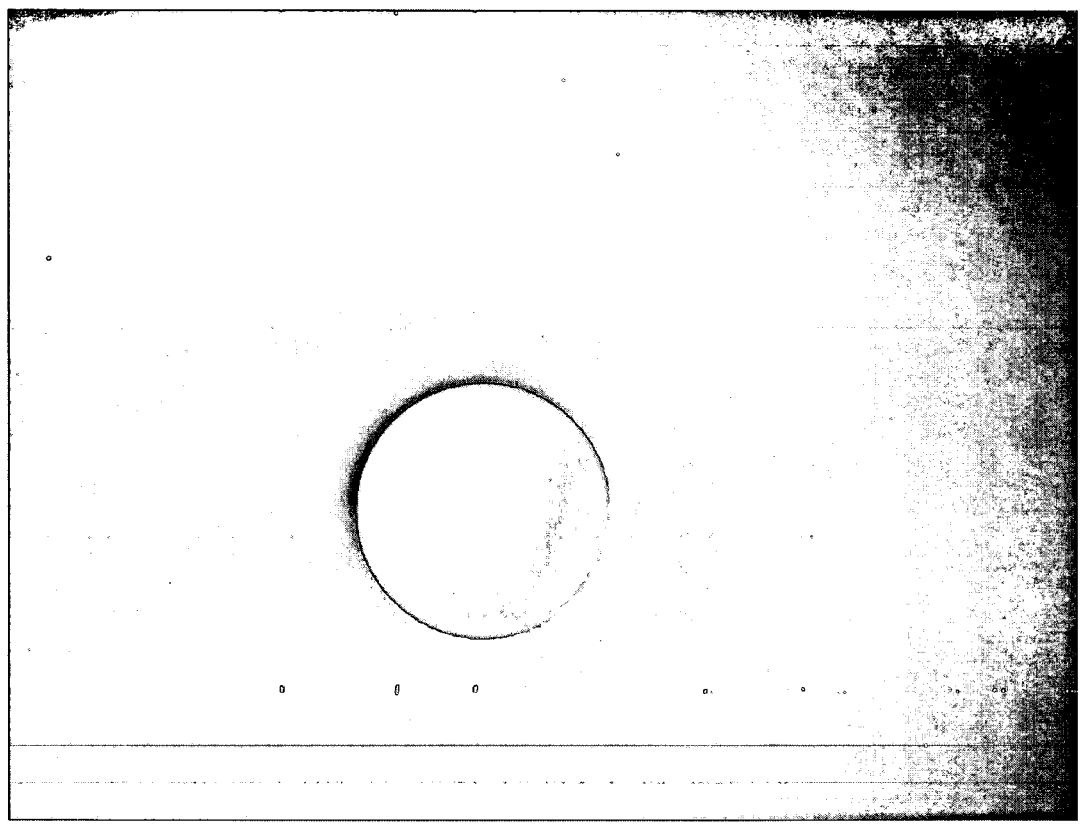
FIG. 12, Displays a photograph of a liquid drop on a nanofiber surface of the invention.
Figure 13:
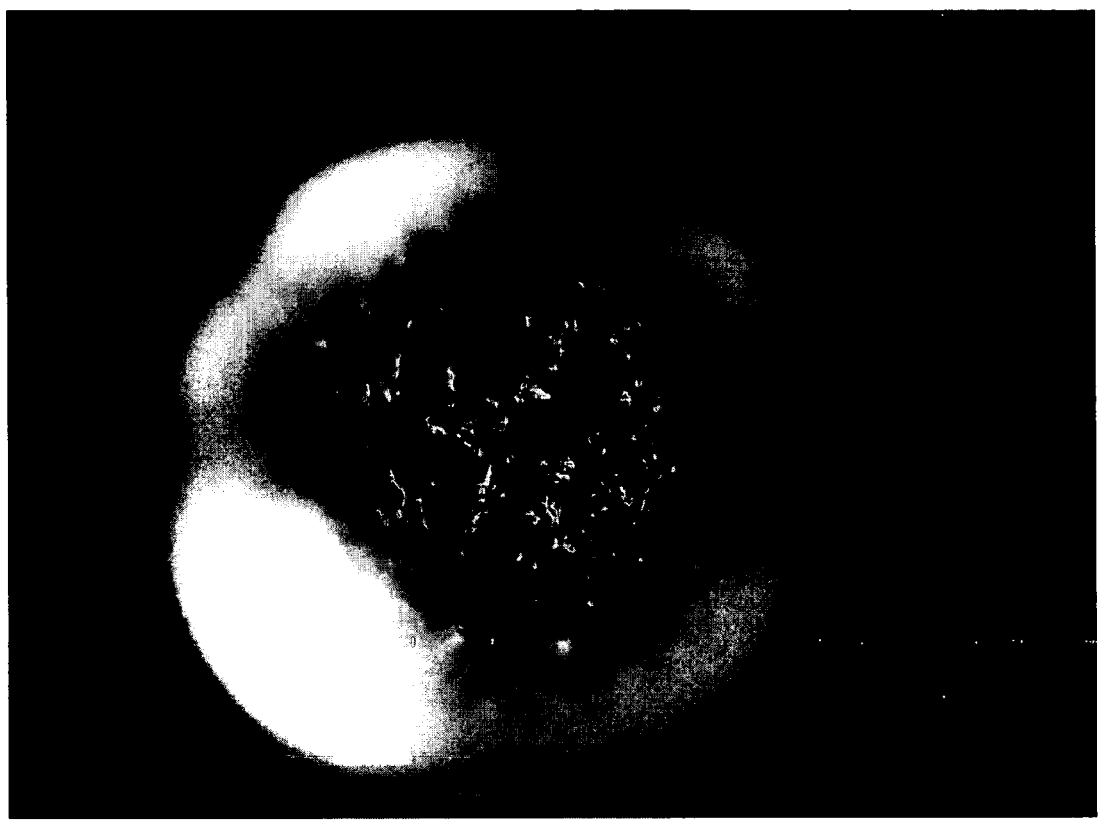
FIG. 13, Displays a photograph of a liquid drop on a nanofiber surface of the invention.
Figure 14:
FIG. 14, Displays a photograph of a liquid drop on a nanofiber surface of the invention.

Water drops were pipetted onto each of the above two surfaces. In both cases, the water formed spherical balls and freely rolled around. For illustration of similar nanowire surfaces of the invention, see, FIGS. 10 and 11 which show water droplets on fluorinated nanowire surfaces of the invention. As can be seen in FIGS. 10 and 11, the water drops show an extremely high contact angle (see, above for detail on contact angle). In FIG. 11, a circular line has been drawn around the water droplet to allow easier visualization of the shape of the drop and of the contact point, 1100, between the drop and the nanowire surface on which it rests. Liquid drops on other liquidphobic surfaces are shown in FIGS. 8 and 9 for comparison. Thus, in FIG. 8 a liquid drop on porous Teflon® tape shows a contact angle at surface contact point, 800, that is less than 180 degrees. Again, a circular line has been drawn in FIG. 8 to aid in visualization of the drop and the contact angle. A similar example is shown in FIG. 9 with a fluorinated silicon surface. It should be noted that the circular visualization line in FIG. 9 is slightly offset, however, it can still clearly be seen that the surface contact point, 900, is much less than that shown in FIGS. 10 and 11. FIGS. 12 through 14 display photomicrographs of liquid drops on nanowire surfaces of the invention. In FIGS. 13 and 14, some nanofibers (here nanowires) of the invention are visible through the liquid drop (i.e., the view is looking down from the top of a liquid drop to the nanofiber surface beneath).

Example 2

Construction of Super Hydrophobic Nanowire Substrates—Slope Test

The 5 cm$^2$ wafer substrate created in the second aspect of Example 1 (i.e., the wafer functionalized with the fluorinated monomer (i.e., wherein the nanowires were "coated" with the fluorinated monomer) was placed at a 1.9 degree angle. A 30 ul drop of water was placed on the elevated end of the wafer. The drop rolled off of the opposite end of the wafer within three seconds, thus, demonstrating a slide angle of under 2 degrees. A drop of mineral oil was also placed on the elevated end of the wafer, and it too slid off of the opposite end within three seconds, thus showing the super-amphiphobicity of the treated wafer.

Example 3

Transfer of Super Hydrophobic Nanowire Substrates

A one inch piece of Scotch® Transparent Tape (3M) was applied to the Tri-Sil® treated nanowire wafer from Example 1. See above. The tape was slowly peeled off of the wafer by hand. Visual inspection indicated that the brown coated nanowires from the wafer had been transferred onto the surface of the tape strip. Water droplets applied to the tape strip beaded up and rolled off of the tape, similar to the water droplets in Example 1, thus, demonstrating the transferability of the treated nanowires from a surface upon which they were grown to a secondary surface. Importantly, the super liquidphobic properties of the treated nanowires transferred to the secondary surface as well.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above can be used in various combinations. All publications, patents, patent applications, or other documents cited in this application are incorporated by reference in their entirety for all purposes to the same extent as if each individual publication, patent, patent application, or other document were individually indicated to be incorporated by reference for all purposes.

What is claimed is:

1. A super-liquidphobic substrate comprising:
at least a first surface; and, a plurality of nanofibers grown on said first surface, the nanofibers comprising a non-carbon material and having an exposed external surface and a first end which is attached to the first surface and a second, free end which is unattached to the first surface and extends from the first surface, which plurality of nanofibers comprises a coating of one or more exogenous liquidphobic material deposited on the exposed external surface of the nanofibers which coating extends over the length of the nanofibers from the first end to the second end thereof.

2. The substrate of claim 1, wherein the nanofibers comprise silicon.

3. The substrate of claim 1, wherein the nanofibers comprise solid nanofibers.

4. The substrate of claim 1, wherein the nanofibers comprise crystalline nanofibers.

5. The substrate of claim 1, wherein the nanofibers comprise a surface density of from about 1 nanofiber per 10 micron$^2$ to about 200 nanofibers per micron$^2$.

6. The substrate of claim 1, wherein the nanofibers comprise a surface density of from about 10 nanofiber per micron$^2$ to about 100 nanofibers per micron$^2$.

7. The substrate of claim 1, wherein the nanofibers comprise a surface density of from about 25 nanofiber per micron$^2$ to about 75 nanofibers per micron$^2$.

8. The substrate of claim 1, wherein the nanofibers comprise a percent coverage of the first surface of from about 0.01% to about 50%.

9. The substrate of claim 1, wherein the nanofibers comprise a percent coverage of the first surface of from about 0.5% to about 30%.

10. The substrate of claim 1, wherein the nanofibers comprise a percent coverage of the first surface of from about 5% to about 15%.

11. The substrate of claim 1, wherein the nanofibers comprise a percent coverage of the first surface of about 1%.

12. The substrate of claim 1, wherein the nanofibers comprise a length of from about 1 micron to about 200 microns.

13. The substrate of claim 1, wherein the nanofibers comprise a length of from about 10 microns to about 125 microns.

14. The substrate of claim 1, wherein the nanofibers comprise a length of from about 1 micron to about 50 microns.

15. The substrate of claim 1, wherein the nanofibers comprise a diameter of from about 5 nanometers to about 1 micron.

16. The substrate of claim 1, wherein the nanofibers comprise a diameter of from about 40 nm to about 200 nm.

17. The substrate of claim 1, wherein the nanofibers comprise a diameter of from about 75 nm to about 100 nm.

18. The substrate of claim 1, wherein the nanofibers have an aspect ratio of from approximately 2:1 to about 40:1.

19. The substrate of claim 1, wherein the nanofibers have an aspect ratio of from approximately 5:1 to about 30:1.

20. The substrate of claim 1, wherein the nanofibers have an aspect ratio of from approximately 10:1 to about 20:1.

21. The substrate of claim 1, wherein the surface comprises silicon, glass, a transparent substrate, a semi-transparent substrate, a translucent substrate, quartz, plastic, metal, polymers, TiO, ZnO, ZnS, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, BaTe, GaN, GaP, GaAs, GaSb, InN, InP, InAs, InSb, PbS, PbSe, PbTe, AlS, AlP, AlSb, SiO1, SiO2, silicon carbide, silicon nitride, polyacrylonitrile (PAN), polyetherketone, polyimide, an aromatic polymer, or an aliphatic polymer.

22. The substrate of claim 1, wherein the exogenous material comprises one or more of a hydrophobic material, a lipophobic material, or an amphiphobic material.

23. The substrate of claim 1, wherein the exogenous material comprises one or more material selected from the group consisting of: a fluoride containing compound, a silane containing compound, PTFE, an aliphatic hydrocarbon containing molecule, an aromatic hydrocarbon containing molecule, and paralyene.

24. The substrate of claim 1, wherein a liquid drop on the substrate displays a contact angle from at least about 160° to about 179.5°.

25. The substrate of claim 1, wherein a liquid drop on the substrate displays a contact angle from at least about 170° to about 179.5°.

26. The substrate of claim 1, wherein a liquid drop on the substrate displays a contact angle from at least about 175° to about 179.5°.

27. The substrate of claim 1, wherein a liquid drop on the substrate displays a contact angle from at least about 178° to about 179.5°.

28. The substrate of claim 1, wherein the nanofibers comprise nanofibers that are grown on the at least first surface.

29. The substrate of claim 1, wherein the nanofibers comprise nanofibers that are grown on a second surface and transferred to the first surface.

30. The substrate of claim 1, wherein the nanofibers comprise silicon oxide nanofibers.

31. A super-liquidphobic substrate, wherein a liquid drop on the substrate displays a contact angle of at least 160° or more, wherein the substrate comprises: at least a first surface, a plurality of nanofibers deposited on said first surface the nanofibers comprising a non-carbon material and having an exposed external surface and a first end which is attached to the first surface and a second, free end which is unattached to the first surface and extends from the first surface, which plurality of nanofibers comprises a coating of one or more exogenous liquidphobic material deposited on the exposed external surface of the nanofibers which coating extends over the length of the nanofibers from the first end to the second end thereof.

32. A system or device comprising: one or more super-liquidphobic substrate of claim 1 or claim 24.

* * * * *